(12) United States Patent
Kim et al.

(10) Patent No.: US 9,831,928 B2
(45) Date of Patent: Nov. 28, 2017

(54) ANTENNA DEVICE AND ELECTRONIC DEVICE INCLUDING THE SAME

(71) Applicant: Samsung Electronics Co., Ltd., Gyeonggi-do (KR)

(72) Inventors: Jaehyung Kim, Gyeonggi-do (KR);
Jae-Ho Lim, Gyeonggi-do (KR);
Hosaeng Kim, Gyeonggi-do (KR);
Jesun Moon, Gyeonggi-do (KR);
Sungyeul Hong, Gyeonggi-do (KR);
Kyung-Jong Lee, Gyeonggi-do (KR);
Jinkyu Bang, Gyeonggi-do (KR);
Hanbin Lee, Gyeonggi-do (KR);
Kyung-Bae Ko, Gyeonggi-do (KR);
Donghwan Kim, Gyeonggi-do (KR);
Taegyu Kim, Gyeonggi-do (KR);
Jae-Bong Chun, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/351,142

(22) Filed: Nov. 14, 2016

(65) Prior Publication Data
US 2017/0141820 A1    May 18, 2017

(30) Foreign Application Priority Data

Nov. 13, 2015 (KR) .................. 10-2015-0159674
Apr. 8, 2016 (KR) .................. 10-2016-0043135

(51) Int. Cl.
*H04B 7/0404* (2017.01)
*H04B 1/40* (2015.01)
*H04M 1/02* (2006.01)

(52) U.S. Cl.
CPC ............ *H04B 7/0404* (2013.01); *H04B 1/40* (2013.01); *H04M 1/0216* (2013.01); *H04M 1/0266* (2013.01)

(58) Field of Classification Search
CPC ..... H04B 7/0404; H04B 1/40; H04M 1/0216; H04M 1/0266
See application file for complete search history.

(56) References Cited

U.S. PATENT DOCUMENTS 6,246,374 B1   6/2001 Perrotta et al.
7,417,593 B1   8/2008 Hsiao et al.
(Continued)

FOREIGN PATENT DOCUMENTS

KR   1020130122793   11/2013

OTHER PUBLICATIONS

International Search Report dated Feb. 10, 2017 issued in counterpart application No. PCT/KR2016/012956, 9 pages.

*Primary Examiner* — Tuan Pham
(74) *Attorney, Agent, or Firm* — The Farrell Law Firm, P.C.

(57) ABSTRACT

An electronic device is provided. The electronic device includes a first housing a second housing, a first display disposed on the first housing and a second display disposed on the second housing, a connecting member configured to couple the first housing to the second housing such that the first housing and the second housing are foldable relative to each other, and the second surface and the fourth surface face each other when the first housing and the second housing are folded toward each other, a first conductive element disposed within the first housing and between the second surface and the first display, and an intermediate conductive plate disposed within the second housing and between the fourth surface and the second display, the intermediate conductive plate having an opening that faces the first conductive element when the first housing and the second housing are in a folded configuration.

20 Claims, 48 Drawing Sheets

(56) References Cited

U.S. PATENT DOCUMENTS

| | | |
|---|---|---|
| 8,649,825 B2 | 2/2014 | Van Wonterghem et al. |
| 2004/0063476 A1 | 4/2004 | Katagishi et al. |
| 2007/0021159 A1* | 1/2007 | Kaneoya ............... H01Q 1/243 455/575.3 |
| 2010/0285851 A1* | 11/2010 | Horihata ............... H01Q 1/243 455/575.3 |
| 2011/0080703 A1 | 4/2011 | Schlesener et al. |
| 2011/0117976 A1* | 5/2011 | Nishikido ............. H01Q 1/243 455/575.3 |
| 2012/0206302 A1 | 8/2012 | Ramachandran et al. |
| 2015/0070219 A1 | 3/2015 | Dinh et al. |

\* cited by examiner

ANTENNA DEVICE AND ELECTRONIC DEVICE INCLUDING THE SAME

PRIORITY

This application claims priority under 35 U.S.C. §119(a) to Korean Patent Application Serial Nos. 10-2015-0159674 & 10-2016-0043135, which were filed in the Korean Intellectual Property Office on Nov. 13, 2015 & Apr. 8, 2016, respectively, the entire content of each of which is incorporated herein by reference.

BACKGROUND

1. Field of the Disclosure

The present disclosure relates generally to an electronic device and more particularly, to an electronic device that includes an antenna device.

2. Description of the Related Art

With the development of electronic communication technologies, electronic devices having various functions have been widely used. These electronic devices generally have a convergence function for performing one or more complex functions.

As the functional differences between electronic devices of respective manufacturers has been reduced, the manufacturers have been making an effort to increase the rigidity of the electronic devices, which are being gradually slimmed in order to satisfy consumers' purchasing needs, and to strengthen the design features of the electronic devices. However, in view of the slimming down of the electronic devices, it becomes more difficult to ensure an adequate space for an arrangement of one or more antenna devices that are typically provided in the electronic devices while preventing a degradation in the radiation efficiency of the antenna devices.

SUMMARY

The present disclosure has been made to address at least the above-mentioned problems and/or disadvantages and to provide at least the advantages described below.

According to an aspect of the present disclosure, an exterior of an electronic device can be formed of a conductive member (e.g., a metal bezel, etc.) and may be used as an antenna radiator in order to meet the demands for a slim electronic device, e as opposed to conventional electronic devices that can have an exterior formed of a dielectric injection-molded material, which is not capable of being used as an antenna radiator.

For example, when a metal bezel is provided on the outer periphery of an electronic device and is used as an antenna radiator, specific positions of the metal bezel may be cut off by filling cut-off portions with non-conductive members made of a dielectric material to adjust the electrical length from a feeding part to the antenna, thereby enabling the antenna to operate in a desired frequency band.

Electronic devices of a rotation type (e.g., a foldable type, a slide type, a swivel type, etc.), each having at least two bodies that are able to rotate relative to each other by means of a connecting part, have been widely used, as well as general bar-type electronic devices. According to an aspect of the present disclosure, a rotation-type electronic device may have at least two bodies that cover each other, and the radiation efficiency of an antenna device provided in one body may be degraded by a metal element that is provided in another body to correspond to the antenna device.

An aspect of the present disclosure provides an antenna device and an electronic device that includes the same.

An aspect of the present disclosure provides an antenna device configured to always exhibit constant or improved radiation efficiency irrespective of the rotation of a body, and an electronic device that includes the same.

An aspect of the present disclosure provides an antenna device configured to prevent a degradation in the performance of the antenna device in advance while employing a conductive element (e.g., a metal element, etc.), and may provide an electronic device that includes the same.

In accordance with an aspect of the present disclosure, there is provided an electronic device. The electronic device includes a first housing a second housing, a first display disposed on the first housing and a second display disposed on the second housing, a connecting member configured to couple the first housing to the second housing such that the first housing and the second housing are foldable relative to each other, and the second surface and the fourth surface face each other when the first housing and the second housing are folded toward each other, a first conductive element disposed within the first housing and between the second surface and the first display, and an intermediate conductive plate disposed within the second housing and between the fourth surface and the second display, the intermediate conductive plate having an opening that faces the first conductive element when the first housing and the second housing are in a folded configuration.

In accordance with an aspect of the present disclosure, there is provided an electronic device. The electronic device includes a first body comprising a first housing, a second body rotatable relative to the first body and comprising a second housing made of metal, a first antenna radiator disposed on the first housing, and an opening provided on the second housing such that the opening overlaps the first antenna radiator when the first body and the second body are in a folded configuration.

In accordance with an aspect of the present disclosure, there is provided an electronic device. The electronic device includes a first body comprising a first housing, a second body rotatable relative to the first body and comprising a second housing made of metal, a first antenna radiator disposed on the first housing, a second antenna radiator overlapping at least a part of the first antenna radiator in the first body, and an opening provided on the second housing such that the opening overlaps the first antenna radiator when the first body and the second body are in a folded configuration.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Figure 1:
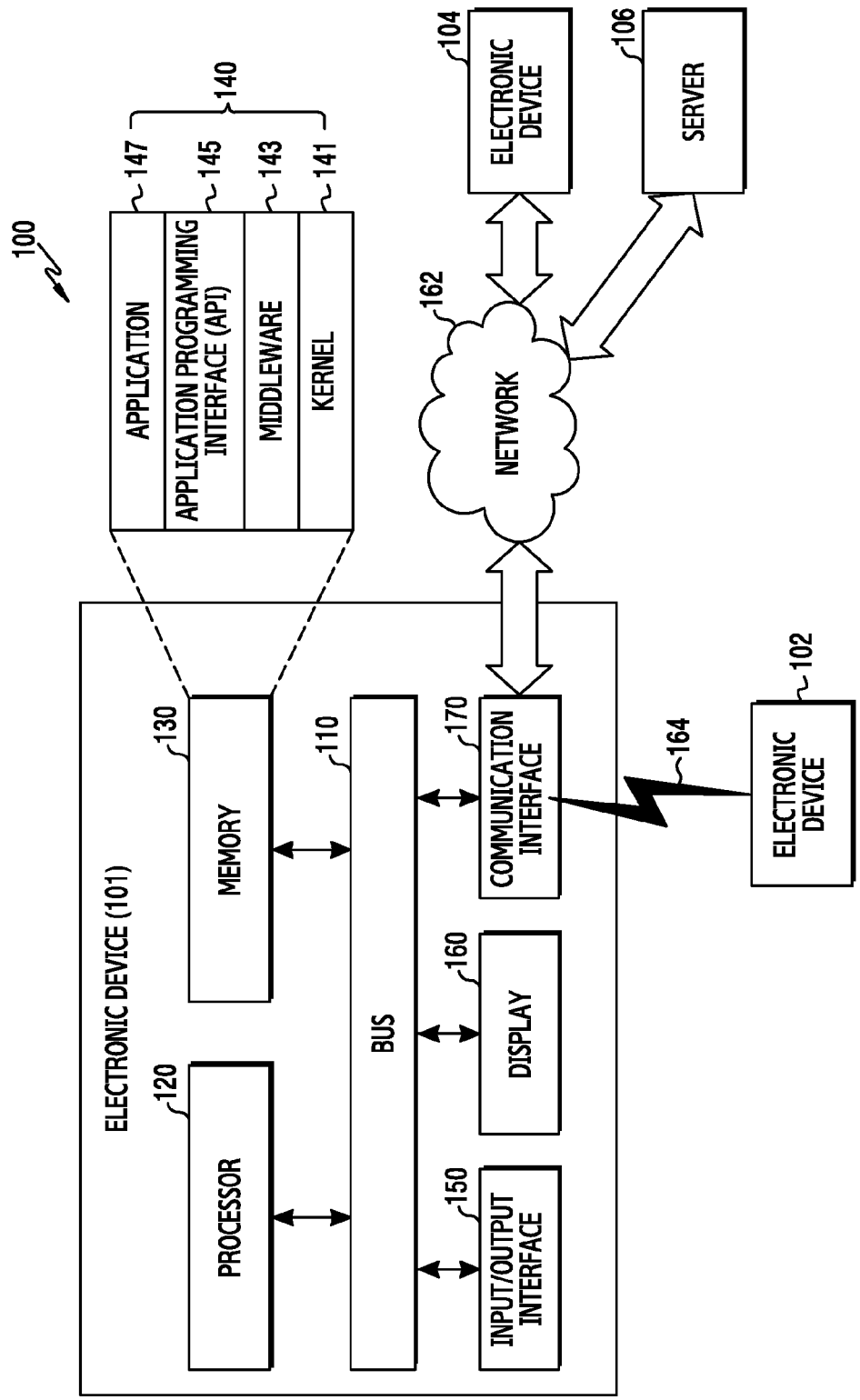
FIG. 1 is a diagram illustrating a network environment that includes an electronic device, according to an embodiment of the present disclosure.

Embodiments of the present disclosure will be described herein below with reference to the accompanying drawings. However, the embodiments of the present disclosure are not limited to the specific embodiments and should be construed as including all modifications, changes, equivalent devices and methods, and/or alternative embodiments of the present disclosure.

The terms and words used in the following description and claims are not limited to their dictionary meanings, but are merely used to enable a clear and consistent understanding of the present disclosure. Accordingly, it should be apparent to those skilled in the art that the following description of embodiments of the present disclosure is provided for illustrative purposes only and not for the purpose of limiting the present disclosure as defined by the appended claims and their equivalents.

Singular terms "a," "an," and "the" include plural references unless the context clearly dictates otherwise. Thus, for example, reference to "a component surface" includes reference to one or more of such surfaces.

The embodiments described herein are by way of illustration only and should not be construed in any way to limit the scope of the disclosure. Those skilled in the art will understand that the principles of the present disclosure may be implemented in any suitably arranged electronic device.

As used herein, the term "substantially" means that the recited characteristic, parameter, or value need not be achieved exactly, but that variations such as tolerances, measurement errors, measurement accuracy limitations and other factors known to those of skill in the art, may occur in amounts that do not preclude the effect the characteristic was intended to provide.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may modify various elements regardless of an order and/or importance of the corresponding elements, and do not limit the corresponding elements. These terms may be used for the purpose of distinguishing one element from another element. For example, a first user device and a second user device may indicate different user devices regardless of the order or importance. For example, a first element may be referred to as a second element without departing from the scope the present disclosure, and similarly, a second element may be referred to as a first element.

When an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, when an element (for example, a first element) is "directly coupled with/to" or "directly connected to" another element (for example, a second element), there is no intervening element (for example, a third element) between the element and another element.

The term "module" as used herein may imply a unit including one of hardware, software, and firmware, or a combination thereof. The term "module" may be interchangeably used with terms, such as unit, logic, logical block, component, or circuit. A module as described herein may be a minimum unit of an integrally constituted component or may be a part thereof. A module may be a minimum unit for performing one or more functions or may be a part thereof. A module may be mechanically or electrically implemented. For example, a module may include at least one of an application-specific integrated circuit (ASIC) chip, field-programmable gate arrays (FPGAs), and a programmable-logic device, which are known or will be developed and which perform certain operations.

All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the present disclosure.

Electronic devices according to the embodiments of the present disclosure may include at least one of, for example, smart phones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, or wearable devices. According to an embodiment of the present disclosure, the wearable devices may include at least one of accessory-type wearable devices (e.g., watches, rings, bracelets, anklets, necklaces, glasses, contact lenses, or head-mounted-devices (HMDs)), fabric or clothing integral wearable devices (e.g., electronic clothes), body-mounted wearable devices (e.g., skin pads or tattoos), or implantable wearable devices (e.g., implantable circuits).

The electronic devices may be smart home appliances. The smart home appliances may include at least one of, for example, televisions (TVs), digital versatile disk (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ and PlayStation™), electronic dictionaries, electronic keys, camcorders, or electronic picture frames.

The electronic devices may include various medical devices (e.g., various portable medical measurement devices (such as blood glucose meters, heart rate monitors, blood pressure monitors, or thermometers, and the like), magnetic resonance angiography (MRA) devices, magnetic resonance imaging (MRI) devices, computed tomography (CT) devices, scanners, ultrasonic devices, and the like), navigation devices, global positioning system (GPS) receivers, event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, automatic teller machines (ATMs), points of sales (POSs) devices, or Internet of Things (IoT) devices (e.g., light bulbs, various sensors, electric or gas meters, sprinkler devices, fire alarms, thermostats, street lamps, toasters, exercise equipment, hot water tanks, heaters, boilers, and the like).

The electronic devices may further include at least one of parts of furniture or buildings/structures, electronic boards, electronic signature receiving devices, projectors, or various measuring instruments (such as water meters, electricity meters, gas meters, wave meters, and the like). The electronic devices may be one or more combinations of the above-mentioned devices. The electronic devices may be flexible electronic devices. Also, the electronic devices are not limited to the above-mentioned devices, and may include new electronic devices according to the development of new technologies.

The electronic device may be one or more combinations of the aforementioned various devices. In addition, the electronic device may be a flexible device. Moreover, the electronic device is not limited to the aforementioned devices.

Hereinafter, the electronic devices according to various embodiments of the present disclosure will be described with reference to the accompanying drawings. The term "user" as used herein may refer to a person who uses an electronic device or may refer to a device (e.g., an artificial intelligence electronic device) which uses an electronic device.

FIG. 1 is a diagram illustrating a network environment including an electronic device, according to an embodiment of the present disclosure.

Referring to FIG. 1, a network environment 100 includes an electronic device 101, which includes a bus 110, a processor 120, a memory 130, an input/output interface 150, a display 160, and a communication interface 170. The electronic device 101 can omit at least one of the components or further include another component.

The bus 110 includes a circuit for connecting the components and delivering communications such as a control message therebetween.

The processor 120 includes one or more of a central processing units (CPUs), an application processor (AP), and a communication processor (CP). The processor 120 processes an operation or data on control of and/or communication with another component of the electronic device 101.

The processor 120, which can be connected to a long term evolution (LTE) network, determines whether a call is connected over a circuit switched (CS) service network using caller identification information, such as a caller phone number of the CS service network, such as a $2^{nd}$ generation (2G) or $3^{rd}$ generation (3G) network. For example, the processor 120 receives incoming call information, such as a CS notification message or a paging request message of the CS service network over the LTE network, such as circuit-switched fallback (CSFB). The processor 120 being connected to the LTE network receives incoming call information, such as a paging request message over the CS service network, such as single radio LTE (SRLTE).

When receiving an incoming CS notification message or a paging request message of the CS service network over the LTE network, the processor 120 obtains caller identification information from the incoming call information. The processor 120 displays the caller identification information on the display 160. The processor 120 determines whether to connect the call based on input information corresponding to the caller identification information displayed on the display 160. For example, when detecting input information corresponding to an incoming call rejection, through the input/output interface 150, the processor 120 restricts the voice call connection and maintains the LTE network connection. For example, when detecting input information corresponding to an incoming call acceptance, through the input/output interface 150, the processor 120 connects the voice call by connecting to the CS service network.

When receiving the incoming CS notification message or a paging request message of the CS service network over the LTE network, the processor 120 obtains caller identification information from the incoming call information. The processor 120 determines whether to connect the call by comparing the caller identification information with a reception control list. For example, when the caller identification information is included in a first reception control list, such as a blacklist, the processor 120 restricts the voice call connection and maintains the connection to the LTE network. When the caller identification information is not included in the blacklist, the processor 120 connects the voice call by connecting to the CS service network. When the caller identification information is included in a second reception control list, such as a white list, the processor 120 connects the voice call by connecting to the CS service network.

When receiving the incoming call information, such as a paging request message of the CS service network over the LTE network, the processor 120 sends an incoming call response message, such as a paging response message, to the CS service network. The processor 120 suspends the LTE service and receives the caller identification information, such as a circuit-switched call (CC) setup message, from the CS service network. The processor 120 determines whether to connect the call by comparing the caller identification information with the reception control list. For example, when the caller identification information is included in the blacklist, the processor 120 restricts the voice call connection and resumes the LTE network connection. When the caller identification information is not included in the he blacklist, the processor 120 connects the voice call by connecting to the CS service network. For example, when the caller identification information is included in the white list, the processor 120 connects the voice call by connecting to the CS service network.

The memory 130 can include volatile and/or nonvolatile memory. The memory 130 stores commands or data, such as the reception control list relating to at least another component of the electronic device 101. The memory 130 may store software and/or a program 140. The program 140 includes a kernel 141, middleware 143, an application programming interface (API) 145, and/or application programs(or applications) 147. At least some of the kernel 141, the middleware 143, and the API 145 may be referred to as an operating system (OS).

The kernel 141 controls or manages system resources, such as the bus 110, the processor 120, or the memory 130 used for performing an operation or function implemented by the other programs, such as the middleware 143, the API 145, or the applications 147. Furthermore, the kernel 141 provides an interface through which the middleware 143, the API 145, or the applications 147 connects the individual elements of the electronic device 101 to control or manage the system resources.

The middleware 143 functions as an intermediary for allowing the API 145 or the applications 147 to communicate with the kernel 141 to exchange data.

In addition, the middleware 143 processes one or more task requests received from the applications 147 according to priorities thereof. For example, the middleware 143 assigns priorities for using the system resources of the electronic device 101, to at least one of the applications 147. For example, the middleware 143 may perform scheduling or load balancing on the one or more task requests by processing the one or more task requests according to the priorities assigned thereto.

The API 145 is an interface through which the applications 147 control functions provided from the kernel 141 or the middleware 143, and may include at least one interface or function, such as an instruction for file control, window control, image processing, or text control.

The input/output interface 150 functions as an interface that transfers instructions or data input from a user or another external device to the other element(s) of the electronic device 101. Furthermore, the input/output interface 150 outputs the instructions or data received from the other element(s) of the electronic device 101 to the user or an external electronic device.

The display 160 may include a liquid crystal display (LCD), a light emitting diode (LED) display, an organic LED (OLED) display, a micro electro mechanical system (MEMS) display, an electronic paper display, etc. The display 160 displays various types of content, such as text, images, videos, icons, or symbols for the user. The display 160 may include a touch screen and receive, for example, a touch, a gesture, proximity, a hovering input, etc., using an electronic pen or a user's body part (e.g., a finger). The display 160 may display a web page.

The communication interface 170 can establish a communication between the electronic device 101 and an external electronic device, such as a first external electronic device 102, a second external electronic device 104, or a server 106. For example, the communication interface 170 can communicate with the first external electronic device 102, the second external electronic device 104, or the server 106 in connection to the network 162 through wireless communication or wired communication or via a short-range communication 164. For example, the wireless communication can conform to a cellular communication protocol including at least one of LTE, LTE-advanced (LTE-A), code division multiple access (CDMA), wideband CDMA (WCDMA), universal mobile telecommunication system (UMTS), wireless broadband (WiBro), and global system for mobile communications (GSM).

The wired communication can include at least one of a universal serial bus (USB), a high definition multimedia interface (HDMI), a recommended standard 232 (RS-232), and a plain old telephone service (POTS).

The network 162 can include a telecommunications network, for example, a computer network such as local area network (LAN) or wide area network (WAN), the Internet, and a telephone network.

The electronic device 101 provides the LTE service in the single radio environment by use of at least one module functionally or physically separated from the processor 120.

Each of the first and second external electronic devices 102 and 104 may be a type of device that is the same as or different from the electronic device 101. The server 106 may include a group of one or more servers. All or some of the operations to be executed by the electronic device 101 may be executed by the electronic devices 102 and 104 or the server 106. When the electronic device 101 may perform a certain function or service automatically or by request, the electronic device 101 may request some functions that are associated therewith from another electronic device instead of or in addition to executing the function or service by itself. The electronic devices 102 and 104 or the server 106 may execute the requested functions or additional functions, and may transmit the results to the electronic device 101. The electronic device 101 may provide the requested functions or services by processing the received results. For example, a cloud computing technique, a distributed computing technique, or a client-server computing technique may be used.

Figure 2:
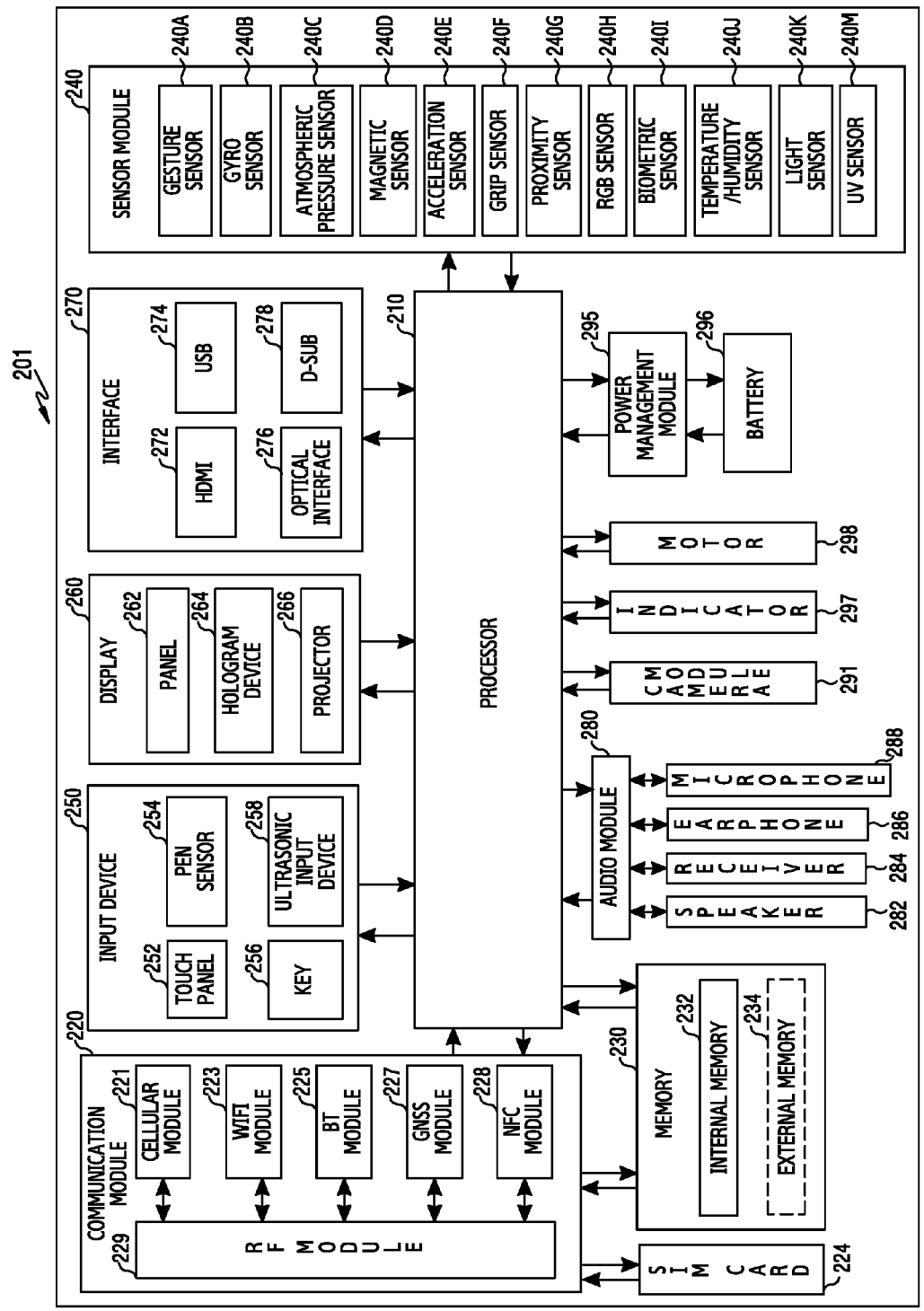
FIG. 2 is a block diagram of an electronic device, according to an embodiment of the present disclosure.

FIG. 2 is a diagram of a configuration of an electronic device, according to an embodiment of the present disclosure.

Referring to FIG. 2, the electronic device 201 includes at least one processor (AP) 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The AP 210 controls a plurality of hardware or software elements connected to the AP 210 by driving an OS or an application program. The AP 210 processes a variety of data, including multimedia data, performs arithmetic operations, may be implemented with a system on chip (SoC) and may further include a graphical processing unit (GPU).

The communication module 220 performs data transmission/reception in communication between the external electronic devices 102, 104 or the server 106 which may be connected with the electronic device 201 through the network 162. The communication module 220 includes a cellular module 221, a wireless-fidelity (Wi-Fi) module 223, a Bluetooth® (BT) module 225, a global navigation satellite system (GNSS) or GPS module 227, a near field communication (NFC) module 228, and a radio frequency (RF) module 229.

The cellular module 221 provides a voice call, a video call, a text service, or an Internet service, such as through a communication network including LTE, LTE-A, CDMA, WCDMA, UMTS, WiBro, and GSM, for example. In addition, the cellular module 221 identifies and authenticates the electronic device 201 within the communication network by using the SIM card 224. The cellular module 221 may perform at least some of the functions that can be provided by the AP 210. For example, the cellular module 221 may perform multimedia control functions.

The cellular module 221 includes a CP. Further, the cellular module 221 may be implemented, for example, with an SoC. Although elements, such as the cellular module 221, the memory 230, and the power management module 295 are illustrated as separate elements with respect to the AP 210 in FIG. 2, the AP 210 may also be implemented such that at least one part, such as the cellular module 221 of the aforementioned elements is included in the AP 210.

The AP 210 or the cellular module 221 loads an instruction or data, which is received from each non-volatile memory connected thereto or at least one of different elements, to a volatile memory and processes the instruction or data. In addition, the AP 210 or the cellular module 221 stores data, which is received from at least one of different elements or generated by at least one of different elements, into the non-volatile memory.

Each of the Wi-Fi module 223, the BT module 225, the GNSS module 227, and the NFC module 228 includes a processor for processing data transmitted/received through a corresponding module. Although the cellular module 221, the Wi-Fi module 223, the BT module 225, the GNSS module 227, and the NFC module 228 are illustrated in FIG. 2 as separate blocks, at least two of the cellular module 221, the Wi-Fi module 223, the BT module 225, the GNSS module 227, and the NFC module 228 may be included in one integrated chip (IC) or IC package. For example, at least some of processors corresponding to the cellular module 221, the Wi-Fi module 223, the BT module 225, the GNSS module 227, and the NFC module 228, such as a communication processor corresponding to the cellular module 221 and a Wi-Fi processor corresponding to the Wi-Fi module 223, may be implemented with an SoC.

The RF module 229 transmits/receives data, such as an RF signal, and may include a transceiver, a power amp module (PAM), a frequency filter, or a low noise amplifier (LNA), for example. In addition, the RF module 229 may further include a component for transmitting/receiving a radio wave on a free space in wireless communication, for example, a conductor, or a conducting wire. The cellular module 221, the Wi-Fi module 223, the BT module 225, the GNSS module 227, and the NFC module 228 may share one RF module 229, and at least one of these modules may transmit/receive an RF signal via a separate RF module.

The SIM card 224 may be inserted into a slot formed at a specific location of the electronic device 201. The SIM card 224 includes unique identification information, such as an integrated circuit card identifier (ICCID) or subscriber information, such as an international mobile subscriber identity (IMSI).

The memory 230 includes an internal memory 232 or an external memory 234.

The internal memory 232 may include at least one of a volatile memory, such as a dynamic random access memory (DRAM), a static RAM (SRAM), or a synchronous dynamic RAM (SDRAM) or a non-volatile memory, such as a one-time programmable read only memory (OTPROM), a programmable ROM (PROM), an erasable and programmable ROM (EPROM), an electrically erasable and programmable ROM (EEPROM), a mask ROM, a flash ROM, a not and (NAND) flash memory, and a not or (NOR) flash memory. The internal memory 232 may be a solid state drive (SSD).

The external memory 234 may include a flash drive, a compact flash (CF), secure digital (SD), micro-SD, mini-SD, extreme digital (xD), and a memory stick, and may be operatively coupled to the electronic device 201 via various interfaces.

The electronic device 201 may further include a storage unit (or a storage medium), such as a hard drive.

The sensor module 240 measures a physical quantity or detects an operation state of the electronic device 201, and converts the measured or detected information into an electric signal. The sensor module 240 includes, for example, at least one of a gesture sensor 240A, a gyro sensor 240B, a barometric pressure sensor or air sensor 240C, a magnetic sensor 240D, an acceleration sensor 240E, a grip sensor 240F, a proximity sensor 240G, a color sensor 240H, such as a red, green, blue (RGB) sensor, a biometric sensor 240K, a temperature/humidity sensor 240J, an illumination/illuminance sensor 240K and an ultraviolet (UV) sensor 240M.

Additionally or alternatively, the sensor module 240 may include, for example, an E-node sensor, an electromyography (EMG) sensor, an electroencephalogram (EEG) sensor, an electrocardiogram (ECG) sensor, and a fingerprint sensor.

The sensor module 240 may further include a control circuit for controlling at least one or more sensors included therein.

The input device 250 includes a touch panel 252, a (digital) pen sensor 254, a key 256, or an ultrasonic input unit 258.

The touch panel 252 recognizes a touch input by using at least one of an electrostatic type configuration, a pressure-sensitive type configuration, and an ultrasonic type configuration. The touch panel 252 may further include a control circuit. In the instance where the touch panel is of the electrostatic type, both physical contact recognition and proximity recognition are possible. The touch penal 252 may further include a tactile layer, which provides the user with a tactile reaction.

The (digital) pen sensor 254 may include a recognition sheet which can be a part of the touch panel or can be separated from the touch panel. The key 256 may include a physical button, an optical key, or a keypad. The ultrasonic input device 258 may detect ultrasonic waves generated by an input tool through a microphone 288, and may confirm data corresponding to the detected ultrasonic waves.

The (digital) pen sensor 254 may be implemented using the same or similar method of receiving a touch input of a user or using an additional sheet for recognition.

The key 256 may be a physical button, an optical key, a keypad, or a touch key.

The ultrasonic input unit 258 detects a reflected sound wave through a microphone 288 and is capable of radio recognition. For example, an ultrasonic signal, which may be generated by using a pen, may be reflected off an object and detected by the microphone 288.

The electronic device 201 may use the communication module 220 to receive a user input from an external device, such as a computer or a server connected thereto.

The display 260 includes a panel 262, a hologram 264, or a projector 266.

The panel 262 may be an LCD or an AM-OLED, for example. The panel 262 may be implemented in a flexible, transparent, or wearable manner, and may be constructed as one module with the touch panel 252.

The hologram device 264 uses an interference of light and displays a stereoscopic image in the air.

The projector 266 displays an image by projecting a light beam onto a screen. The screen may be located inside or outside the electronic device 201.

The display 260 may further include a control circuit for controlling the panel 262, the hologram device 264, or the projector 266.

The interface 270 may include an HDMI 272, a USB 274, an optical communication interface 276, or a d-subminiature (D-sub) 278. The interface 270 may be included, for example, in the communication interface 160 of FIG. 1, and may include a mobile high-definition link (MHL), SD/multimedia card (MMC) or infrared data association (IrDA).

The audio module 280 bilaterally converts a sound and an electric signal. At least some elements of the audio module 280 may be included in the input/output interface 150 of FIG. 1. The audio module 280 converts sound information which is input or output through a speaker 282, a receiver 284, an earphone 286, or the microphone 288.

The speaker 282 may output a signal of an audible frequency band and a signal of an ultrasonic frequency band. Reflected waves of an ultrasonic signal emitted from the speaker 282 and a signal of an external audible frequency band may be received.

The camera module 291 is a device for image and video capturing, and may include one or more image sensors, such as a front sensor or a rear sensor, a lens, an image signal processor (ISP), or a flash, such as an LED or a xenon lamp. In certain instances, it may prove advantageous to include two or more camera modules.

The power management module 295 manages power of the electronic device 201. The power management module 295 may include a power management integrated circuit (PMIC), a charger IC, or a battery gauge.

The PMIC may be placed inside an IC or an SoC semiconductor and may use a wired charging and/or a wireless charging method. The charger IC can charge a battery and can prevent an over-voltage or over-current flow.

The wireless charging may be classified, for example, into a magnetic resonance type, a magnetic induction type, and an electromagnetic type. An additional circuit for the wireless charging, such as a coil loop, a resonant circuit, or a rectifier may be added.

The battery gauge may measure a residual quantity of the battery 296 and a voltage, current, and temperature during charging. The battery 296 stores or generates electricity and supplies power to the electronic device 201 by using the stored or generated electricity. The battery 296 may include a rechargeable battery or a solar battery.

The indicator 297 indicates a specific state, such as a booting state, a message, or a charging state of the electronic device 201 or a part thereof, such as the AP 210.

The motor 298 converts an electric signal into a mechanical vibration.

The electronic device 201 includes a processing unit, such as a GPU, for supporting mobile TV which processes media data according to a protocol of, for example, digital multimedia broadcasting (DMB), digital video broadcasting (DVB), or media flow.

Each of the aforementioned elements of the electronic device 201 may consist of one or more components, and names thereof may vary depending on a type of the electronic device 201. The electronic device 201 may include at least one of the aforementioned elements. Some of the elements may be omitted, or additional other elements may be further included. In addition, some of the elements of the electronic device 201 may be combined and constructed as one entity, so as to equally perform functions of corresponding elements before combination.

At least some parts of the electronic device 201, such as modules or functions thereof, or operations, may be implemented with an instruction stored in a non-transitory computer-readable storage media for example. The instruction may be executed by the processor 210, to perform a function corresponding to the instruction. The non-transitory computer-readable storage media may be the memory 230. At least some parts of the programming module may be executed by the processor 210. At least some parts of the programming module may include modules, programs, routines, and a set of instructions for performing one or more functions.

In accordance with the present disclosure, an antenna device may be applied to various rotation-type electronic devices, each of which can include a first body and a second body that is rotatable relative to the first body, but the antenna device is not limited thereto. For example, the antenna device may also be applied to an electronic device having a single body in which an antenna device and a conductive element (e.g., a metal element, a metal ornament, etc.) overlap each other.

Figure 3A:
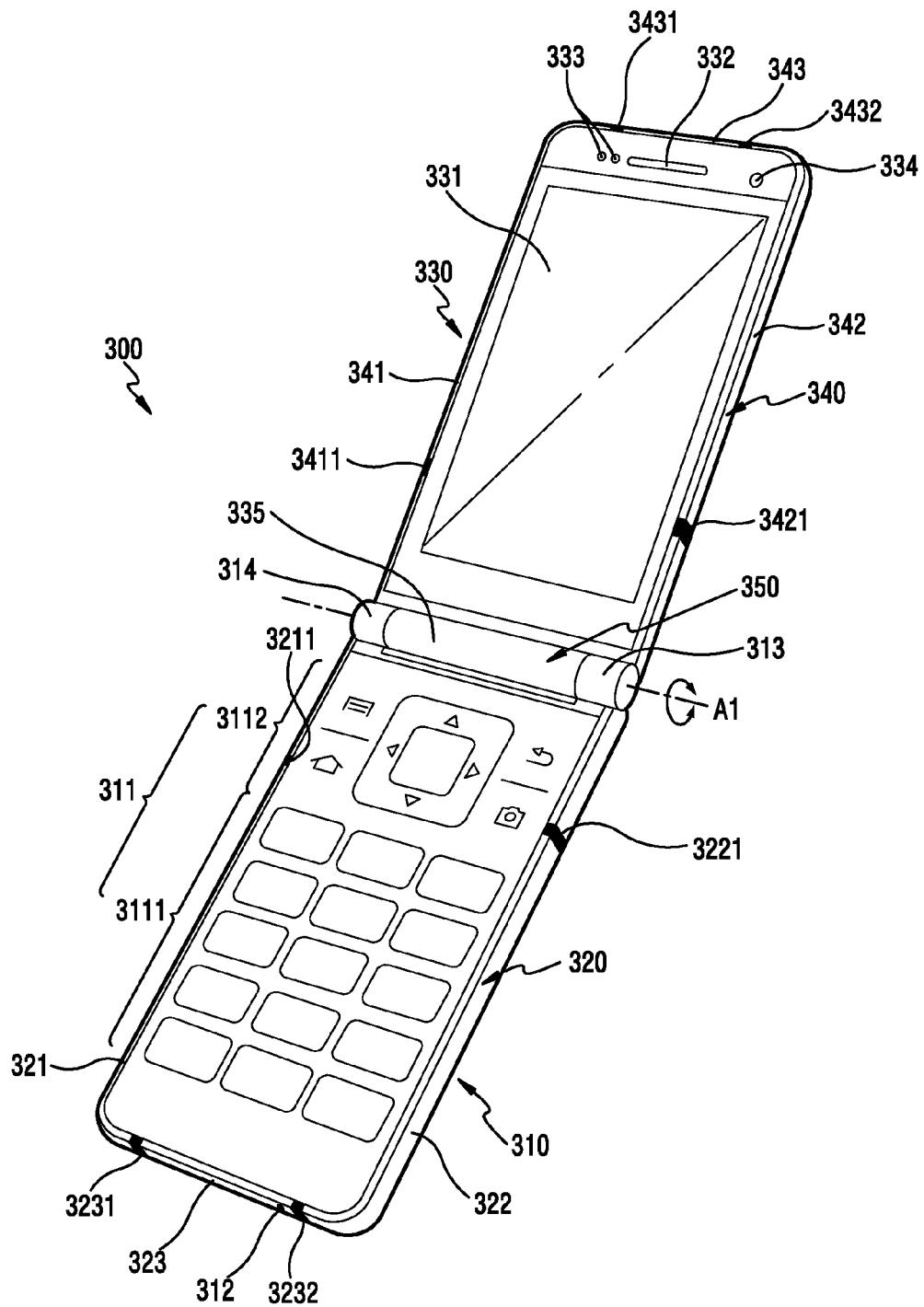
FIGS. 3A and 3B are perspective views of an electronic device, according to an embodiment of the present disclosure.
Figure 3B:
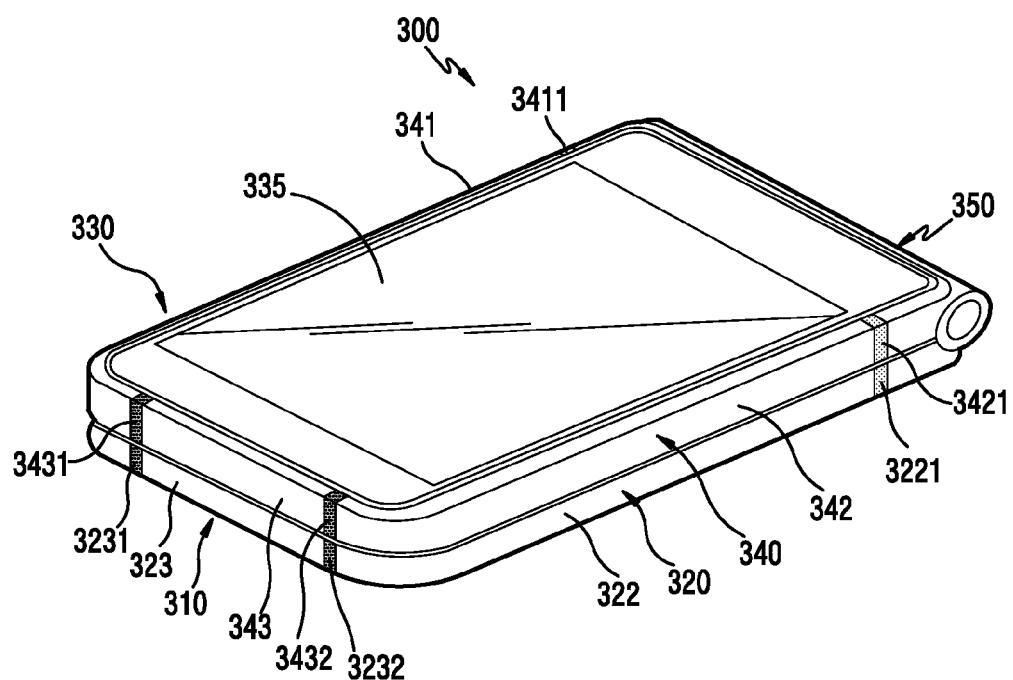

FIGS. 3A and 3B are perspective views of an electronic device 300, according to an embodiment of the present disclosure.

Referring to FIGS. 3A and 3B, the electronic device 300 includes a first body 310 and a second body 330 that are rotatable relative each other about a connecting device 350 (e.g., a hinge device). The second body 330 may be folded with respect to the first body 310 by the connecting device 350 with an axis A1 as a rotational axis, in which case the first body 310 and the second body 330 may cover each other when they are in a folded configuration. The first body 310 includes a key input unit 311 on the front surface thereof, and the key input unit 311 may include a plurality of key buttons 3111 (e.g., key buttons for inputting numbers, characters, and/or symbols) and a navigation key button 3112. The first body 310 includes a microphone device 312 disposed at the lower side thereof.

The first body 310 includes a first housing 320. At least a part of the first housing 320 includes conductive members 321, 322, and 323. The conductive members 321, 322, and 323 form a loop along an outer periphery of the first body 310 and may serve as an entirety or a part of a thickness of the electronic device 300. The conductive members 321, 322, and 323 may extend to at least one area of the front and/or rear surface of the electronic device 300.

The conductive members 321, 322, and 323 may be disposed at left, right, and lower sides of the first body 310, respectively. The conductive members 321, 322, and 323 are separated from each other by non-conductive members 3211, 3221, 3231, and 3232 that fill gaps formed in one or more areas of the conductive members. The first conductive member 321 is separated by the first non-conductive member 3211, the second conductive member 322 is separated by the second non-conductive member 3221, and the third conductive member 323 is separated by the third and fourth non-conductive members 3231 and 3232. The non-conductive members 3211, 3221, 3231, and 3232 may be air, plastic, or an appropriate non-conductive material. The non-conductive members 3211, 3221, 3231, and 3232 may prevent foreign substances from being introduced through the gaps.

The first body 310 may include one or more antenna devices therein. The antenna devices may include the corresponding conductive members 321, 322, and 323 that can be electrically connected to an RF communication module in the vicinity of the non-conductive members 3211, 3221, 3231, and 3232 to operate as antenna radiators. Operating frequency bands of the antenna devices may be determined in consideration of electrical lengths from the non-conductive members 3211, 3221, 3231, and 3232 to feeding points between the corresponding conductive members 321, 322, and 323 and the RF communication module. The antenna devices may be disposed around the plurality of non-conductive members 3211, 3221, 3231, and 3232. The antenna devices, however, may also be separately disposed inside the electronic device 300. The antenna devices may include antenna radiators that can be provided in a pattern type on a PCB included in the electronic device 300, or may include antenna radiators that can be mounted on an antenna carrier.

The second body 330 includes a first display 331 that can be disposed on the front surface thereof and a speaker device 332 that can be disposed on the upper side of the first display 331 to receive speech. Components for performing the various functions of the electronic device 300 may be arranged around the speaker device 332. The components may include at least one sensor module 333. The sensor module 333 may include, for example, at least one of an illuminance sensor (e.g., an optical sensor), a proximity sensor, an infrared sensor, and an ultrasonic sensor. The components may also include a camera device 334. The components may also include an LED indicator for informing a user of status information of the electronic device 300. The second body 330 may have a second display 335 disposed on the rear surface thereof. The electronic device 300 may be operated through the second display 335 while the second body 330 of the electronic device 300 is superposed on the first body 310. The first and second displays 331 and 335 may be touch screen devices that include touch sensors.

The second body 330 includes a second housing 340. At least a part of the second housing 340 includes conductive members 341, 342, and 343, which can form a loop shape along an outer periphery of the second body 330 and may serve as an entirety or a part of the thickness of the electronic device 300. The conductive members 341, 342, and 343 may extend to at least one area of the front and/or rear surface of the electronic device 300.

The conductive members 341, 342, and 343 may include the first, second, and third conductive members 341, 342, and 343 disposed at the left, right, and upper sides of the second body 330, respectively. The conductive members 341, 342, and 343 may be separated from each other by non-conductive members 3411, 3421, 3431, and 3432 that fill gaps formed in one or more areas of the conductive members 341, 342, and 343. The first conductive member 341 may be separated by the first non-conductive member 3411, the second conductive member 342 may be separated by the second non-conductive member 3421, and the third conductive member 343 may be separated by the third and fourth non-conductive members 3431 and 3432.

When the second body 330 is superposed on the first body 310, the first non-conductive member 3211 of the first housing 320 may face the first non-conductive member 3411 of the second housing 340, the second non-conductive member 3221 of the first housing 320 may face the second non-conductive member 3421 of the second housing 340, the third non-conductive member 3231 of the first housing 320 may face the third non-conductive member 3431 of the second housing 340, and the fourth non-conductive member 3232 of the first housing 320 may face the fourth non-conductive member 3432 of the second housing 340.

Slots having one or more suitable lengths may be provided near the areas of the conductive members 341, 342, and 343 of the second housing 340 that correspond to the areas where the antenna devices are disposed in the first housing 320. The slots may include the non-conductive members 3411, 3421, 3431, and 3432, and the non-conductive members 3411, 3421, 3431, and 3432 included in the slots may serve as openings through which the slots are exposed to the outside of the electronic device 300. Accordingly, the antenna devices may effectively conduct radiation through the corresponding slots when the second body 330 is superposed on the first body 310 (i.e., when the second body 330 and the first body 310 are in a folded configuration.

The connecting device 350 may include a hinge device. The hinge device includes a pair of side hinge arms 313 and 314 that are disposed on the upper end of the first body 310 and spaced apart from each other, and a central hinge arm 335 of the second body 330 that is disposed between the side hinge arms 313 and 314, thereby allowing rotation of the first body 310 and the second body 330. Although not illustrated in the drawings, a hinge module operating in conjunction with the side hinge arms 313 and 314 may be provided in the central hinge arm 335 to adjust the rotation angle of the second body 330 or to continually apply a pressure in a direction in which the second body 330 is opened or closed at more than an angle of inflection.

More or fewer non-conductive members may be provided in each of the bodies, and may be disposed in diverse positions in the electronic device 300.

Figure 4:
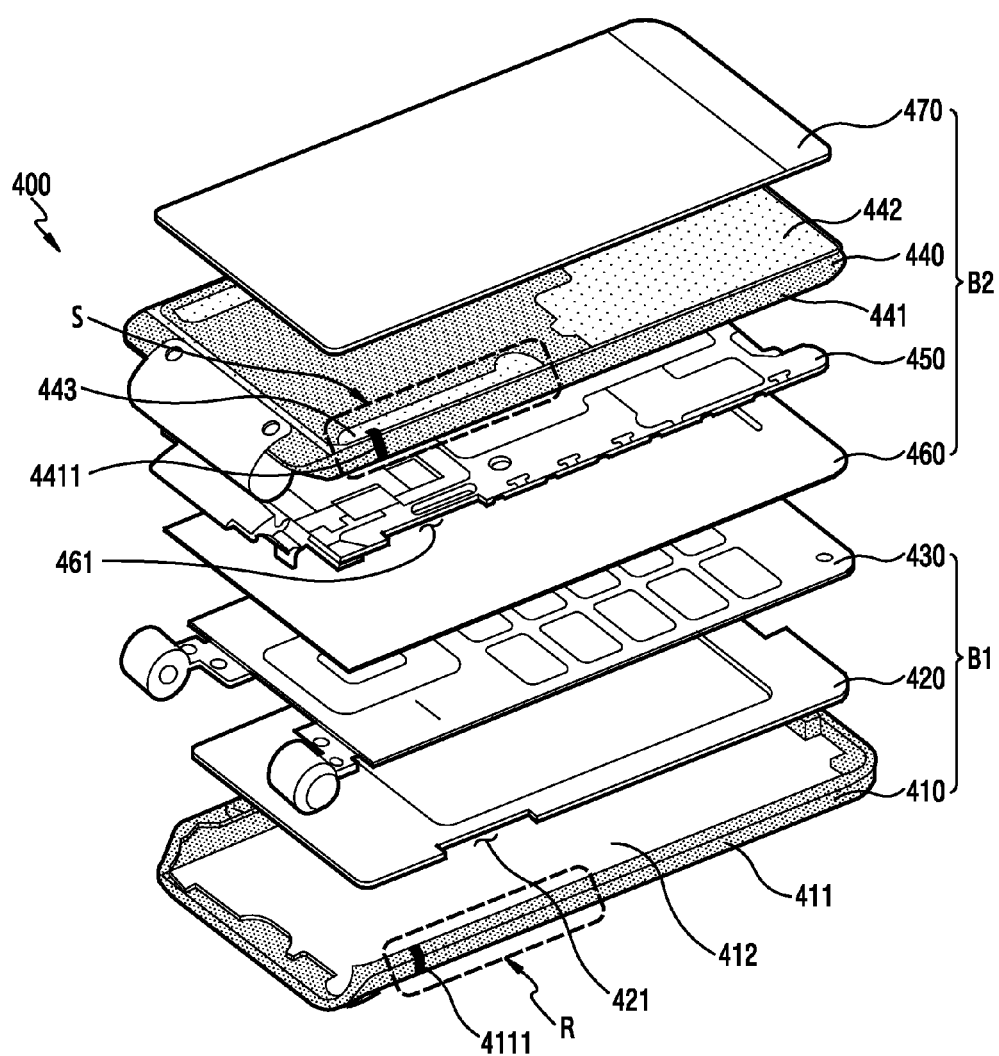
FIG. 4 is an exploded perspective view of an electronic device, according to an embodiment of the present disclosure.

FIG. 4 is an exploded perspective view of an electronic device 400, according to various embodiments of the present disclosure.

The electronic device 400 of FIG. 4 may be similar to the electronic device 300 of FIG. 3A.

Referring to FIG. 4, the electronic device 400 includes a first body B1 and a second body B2 that is able to rotate relative to the first body B1.

the first body B1 includes a first housing 410, a printed circuit board (PCB) 420 disposed inside the first housing 410, and a keypad assembly 430 serving as an upper housing. At least a part of the first housing 410 includes a conductive member 411. At least a part of the first housing 410 includes an injection-molded member 412. The conductive member 411 and the injection-molded member 412 of the first housing 410 may be integrally formed with each other by double injection molding or insert molding. The conductive member 411 is separated by a non-conductive member 4111 that fills a gap having a predetermined width, which is formed in the conductive member 411. At least a part of the conductive member 411 in the vicinity of the non-conductive member 4111 of the first housing 410 may serve as an antenna area (area R). The antenna device may be operated by electrically connecting an RF communication module on the PCB 420 to a position that corresponds to the conductive member 411 and is separate from the non-conductive member 4111 by a predetermined distance. The non-conductive member 4111 may be formed of a material that is the same as that of the injection-molded member 412.

The second body B2 includes a second housing 440, and an internal housing 450 (e.g., a bracket, etc.) and a first display 460 that are sequentially mounted on a first surface of the second housing 440. The second body B2 includes a second display 470 mounted on a second surface of the second housing 440. The first display 460 and the second display 470 may serve as touch screen devices that include touch sensors. In a case where the second housing 440 is formed of a conductive material, the first display 460 and the second display 470 may be electrically insulated from the second housing 440 and/or the internal housing 450 (e.g., a metal bracket, etc.), which can be made of a conductive material in order to prevent the problem of an electric shock. The first display 460 and the second display 470 may be attached to the second housing 440 by an insulating cushion member, an insulating double-sided tape, etc.

A conductive member 441 and an injection-molded member 442 of the second housing 440 may be integrally formed with each other by double injection molding or insert molding. The conductive member 441 may be separated by a non-conductive member 4411 that fills a gap having a predetermined width, which is formed in the conductive member. A slot 443 having a predetermined length may be formed in an area (area S) near the non-conductive member 4411 of the second housing 440. The slot 443 may be configured to extend along with the non-conductive member 4411. The slot 443 and/or the non-conductive member 4411 may be formed of the same material as that of the injection-molded member 442 when the injection-molded member 442 is formed.

The antenna area (area R) of the first housing 410 and the slot area (area S) of the second housing 440 may face each other when the second body B2 is superposed on the first body B1. An RF signal radiated from the antenna area R may be easily radiated through the slot 443.

A space may be formed in a position that corresponds to an electronic component interposed between the antenna area R of the first housing 410 and the slot area S of the second housing 440 in order to minimize interference caused by the electronic component. A recess 421 being inwardly cut may be formed in the PCB 420 to correspond to the electronic component. A recess 461 being inwardly cut may be formed in the internal housing 450 (e.g., conductive bracket, etc.) to correspond to the electronic component. Although not illustrated, at least a part of the first and second displays 460 and 470 coupled to the second housing 440 may not overlap at least a part of the slot 443.

Figure 5A:
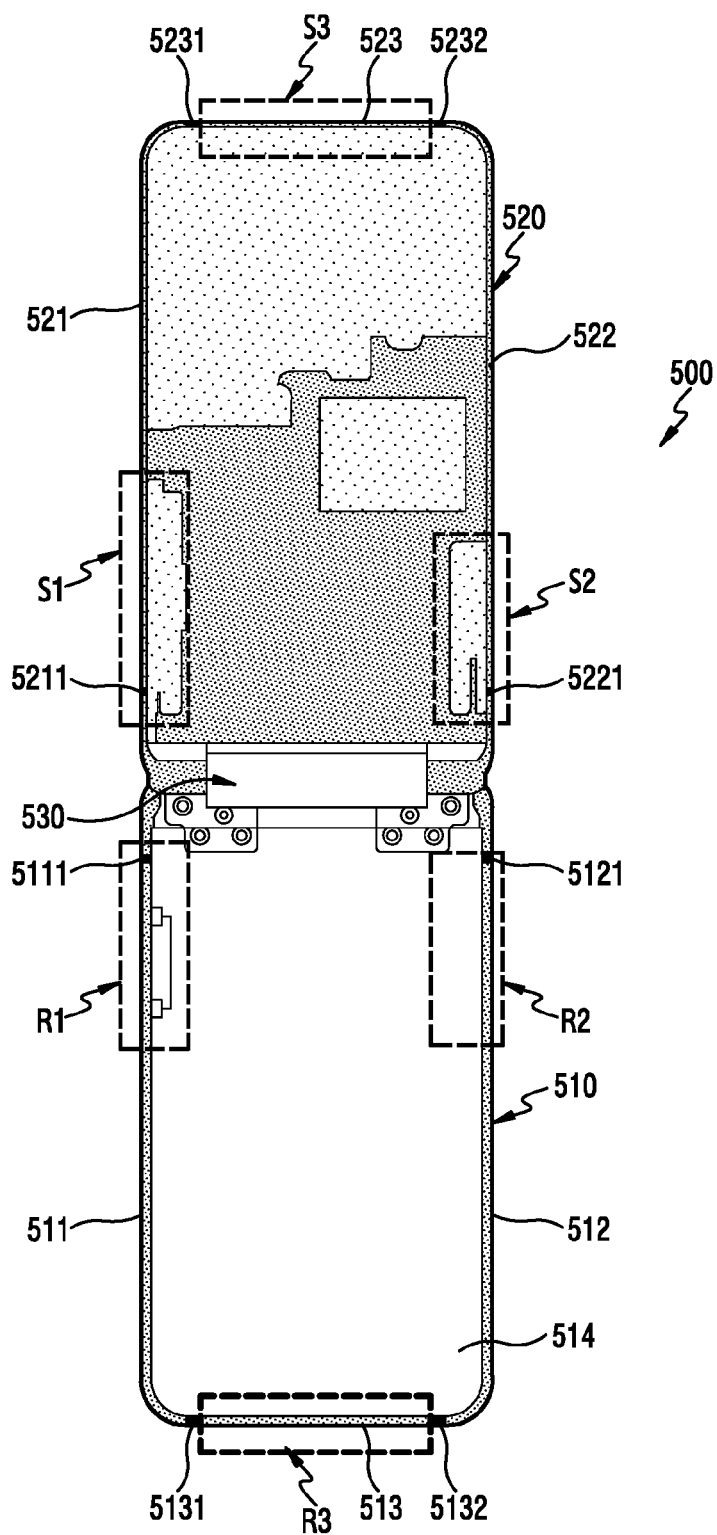
FIG. 5A is a schematic view of an electronic device, which illustrates an arrangement relation between antenna devices and slots, according to an embodiment of the present disclosure.

FIG. 5A is a schematic view of an electronic device 500, which illustrates an arrangement relation between antenna devices and slots, according to an embodiment of the present disclosure.

The electronic device 500 of FIG. 5A may be similar to the electronic devices 300 and 400 of FIGS. 3A and 4, respectively.

Referring to FIG. 5A, the electronic device 500 includes a first housing 510 and a second housing 520 that may be folded with respect to the first housing 510 by rotating about a connecting device 530 (e.g., a hinge device). In a case where the second housing 520 is folded with respect to the first housing 510, the first housing 510 and the second housing 520 may cover each other.

At least a part of the first housing 510 includes conductive members 511, 512, and 513. The conductive members 511, 512, and 513 may form a loop shape along an outer periphery of the first housing 510 and may serve as the entirety or a part of the thickness of the electronic device 500.

The conductive members 511, 512, and 513 may be disposed at the left, right, and lower sides of the first housing 510, respectively. The conductive members 511, 512, and 513 may be separated from each other by non-conductive members 5111, 5121, 5131, and 5132 that fill gaps formed in one or more areas of the conductive members 511, 512, and 513. The first conductive member 511 may be separated by the first non-conductive member 5111, the second conductive member 512 may be separated by the second non-conductive member 5121, and the third conductive member 513 may be separated by the third and fourth non-conductive members 5131 and 5132.

The first housing 510 may have one or more antenna devices therein. The antenna devices may include the corresponding conductive members 511, 512, and 513 that are electrically connected to an RF communication module in the vicinity of the non-conductive members 5111, 5121, 5131, and 5132 to operate as antenna radiators. In this case, operating frequency bands of the antenna devices may be determined in consideration of electrical lengths from the non-conductive members 5111, 5121, 5131, and 5132 to feeding points between the corresponding conductive members 511, 512, and 513 and the RF communication module. The antenna devices may be disposed around the plurality of non-conductive members 5111, 5121, 5131, and 5132. For example, the antenna devices may be disposed in an area R1 at the left side, an area R2 at the right side, and an area R3 at the lower side of the first housing 510.

At least a part of the second housing 520 includes conductive members 521, 522, and 523. The conductive members 521, 522, and 523 may form a loop shape along the outer periphery of the second housing 520 and may serve as the entirety or a part of the thickness of the electronic device 500.

The conductive members 521, 522, and 523 may be disposed at the left, right, and upper sides of the second housing 520, respectively. The conductive members 521, 522, and 523 may be separated from each other by non-conductive members 5211, 5221, 5231, and 5232 that fill gaps formed in one or more areas of the conductive members. The first conductive member 521 may be separated by the first non-conductive member 5211, the second conductive member 522 may be separated by the second non-conductive member 5221, and the third conductive member 523 may be separated by the third and fourth non-conductive members 5231 and 5232.

When the second housing 520 is superposed on the first housing 510, the first non-conductive member 5111 of the first housing 510 may face the first non-conductive member 5211 of the second housing 520, the second non-conductive member 5121 of the first housing 510 may face the second non-conductive member 5221 of the second housing 520, the third non-conductive member 5131 of the first housing 510 may face the third non-conductive member 5231 of the second housing 520, and the fourth non-conductive member 5132 of the first housing 510 may face the fourth non-conductive member 5232 of the second housing 520.

Slots having one or more suitable lengths may be provided near the corresponding areas of the conductive members 521, 522, and 523 of the second housing 520 that correspond to the areas where the antenna devices are disposed in the first housing 320. For example, the slots may be disposed in an area S1 on the left side, an area S2 on the right side, and an area S3 on the upper side of the second housing 520. The slots may include the non-conductive members 5211, 5221, 5231, and 5232, and the non-conductive members 5211, 5221, 5231, and 5232 included in the slots may serve as openings through which the slots are exposed to the outside of the electronic device 500. Accordingly, the antenna devices may effectively conduct radiation through the corresponding slots when the second housing 520 is superposed on the first housing 510.

Hereinafter, the antenna devices and the slots corresponding thereto will be described in detail.

Figure 5B:
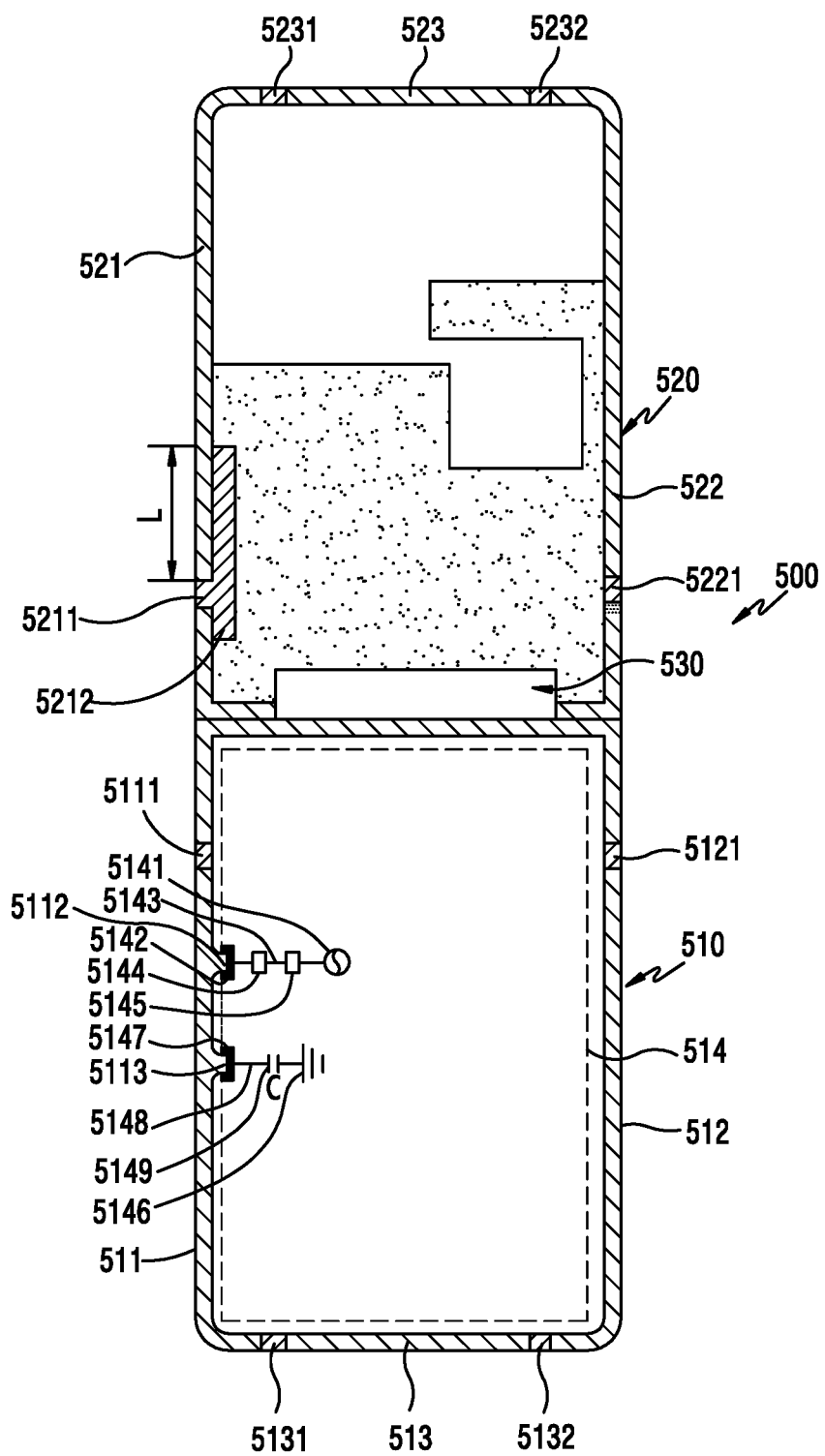
FIG. 5B is a schematic view of a configuration of an antenna device and a corresponding slot in the electronic device, according to the an embodiment of the present disclosure.

FIG. 5B is a diagram illustrating a configuration of one antenna device according to the arrangement of the corresponding slot in the electronic device 500, according to an embodiment of the present disclosure.

It should be understood that the antenna device disposed in the area R1 of the first housing 510 of FIG. 5A and the corresponding slot disposed in the area S1 of the second housing 520 are illustrated and described herein, but the non-illustrated antenna devices disposed in the areas R2 and R3 of the first housing 510 and the non-illustrated corresponding slots disposed in the areas S2 and S3 of the second housing 520 have the same technical configuration. In addition, since technical members having reference numerals identical to those illustrated in FIG. 5A perform identical functions, detailed descriptions thereof will be omitted for the convenience of description.

Referring to FIG. 5B, the first conductive member 511 of the housing 510 includes a feeding piece 5112 integrally formed therewith in a position spaced apart from the first non-conductive member 5111 by a predetermined distance. The feeding piece 5112 may be connected to a feeding part 5141 of a PCB 514 in the first housing 510, or may be electrically connected to the feeding part 5141 by a separate electrical connection member (e.g., a C-clip, etc.).

A feeding pad 5142 may be disposed on the PCB 514 and may be electrically connected with the feeding piece 5112 of the first conductive member 511. A first electrical path (e.g., a wire line) 5143 may be formed from the feeding pad 5142 to the feeding part 5141. A first electric-shock prevention circuit 5144 for preventing an electric shock and discharging static electricity and a matching circuit 5145 for tuning the antenna radiator to a desired frequency band may be provided on the first electrical path 5143, since the feeding pad 5142 of the PCB 514 makes direct electrical contact with the first conductive member 511 that forms the external appearance of the electronic device 500.

The first conductive member 511 may have an electrical connection piece 5113 integrally formed therewith in a position spaced apart from the feeding piece 5112 by a predetermined distance. The electrical connection piece 5113 may be grounded to a ground part 5146 of the PCB 514. The electrical connection piece 5113 of the first conductive member 511 may be grounded to the ground part 5146 of the PCB 514 in the first housing 510, or may be electrically connected to the ground part 5146 by a separate electrical connection member (e.g., a C-clip, etc.).

A ground pad 5147 may be disposed on the PCB 514 and may be electrically connected with the electrical connection piece 5113 of the first conductive member 511. A second electrical path (e.g., a wire line) 5148 may be formed from the ground pad 5147 to the ground part 5146. A second electric-shock prevention circuit 5149 (e.g., a capacitor) for preventing an electric shock and discharging static electricity may be provided on the second electrical path 5148, since the first ground pad 5147 of the PCB 514 makes direct electrical contact with the first conductive member 511 that forms the external appearance of the electronic device 500.

A slot 5212 having a suitable length may be disposed near the first non-conductive member 5211 of the second housing 520. The slot 5212 may be formed such that it extends toward the feeding piece 5112 of the first housing 510 from the first non-conductive member 5211 when the first housing 510 is superposed on the second housing 520. The slot 5212 may be disposed in a position where the slot is electrically coupled with the first conductive member 511 of the first housing 510, which is electrically connected to the PCB 514 to operate as an antenna device, when the first housing 510 is superposed on the second housing 520. The length by which the slot 5212 extends toward the feeding piece 5112 may be adjusted to control the operating frequency band of the first conductive member 511 that operates as an antenna device.

Figure 5C:
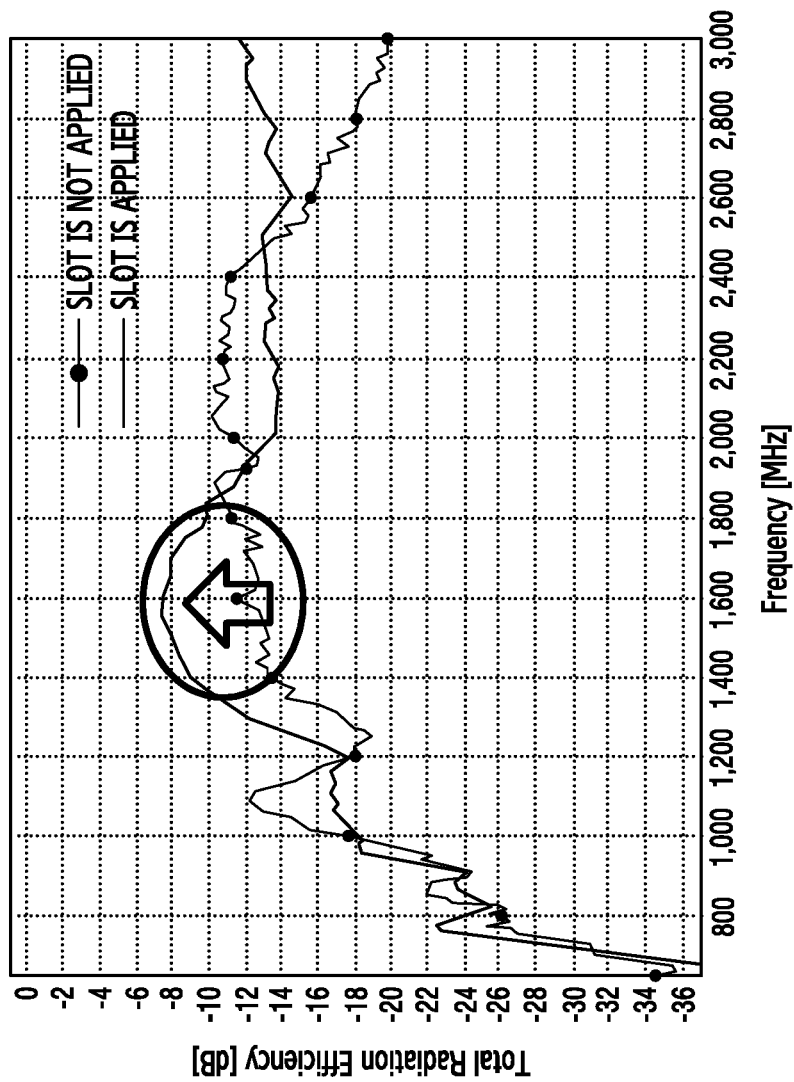
FIG. 5C is a graph depicting radiation efficiency of the antenna device according to a presence or absence of a slot, according to an embodiment of the present disclosure.

FIG. 5C is a graph depicting radiation efficiency of the antenna device according to a presence or absence of a slot, according to an embodiment of the present disclosure.

As illustrated in FIG. 5C, when the second housing 520 has the slot 5212, the first conductive member 511, which operates as an antenna radiator of the first housing 510, has a gain that is about 5 dB greater than that when the second housing 520 has no slot 5212. For example, when the second housing 520 has no slot, the antenna has a gain of about −12 dB in a 1575 MHz band (e.g., a GPS operating frequency band), which is the operating frequency band of the antenna, and when the second housing 520 has the slot 5212, the antenna has a gain of about −7 dB in the same frequency band, thereby resulting in an increase in the gain of about 5 dB.

Figure 6A:
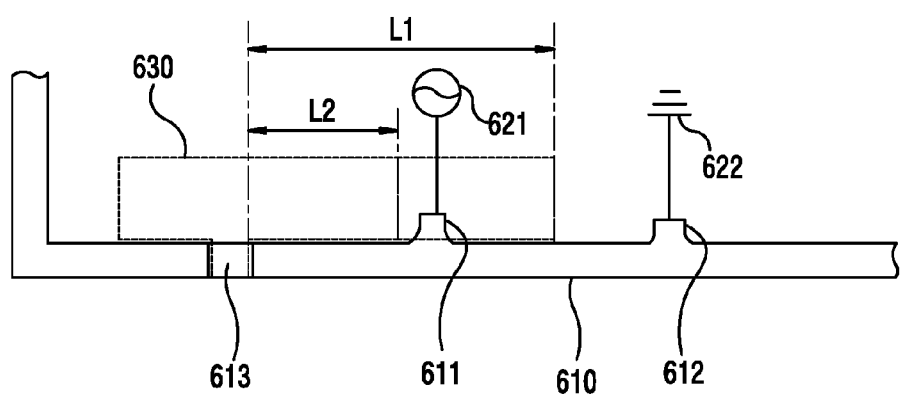
FIGS. 6A and 6B are diagrams illustrating a configuration of antenna devices that correspond to various lengths of slots, according to an embodiment of the present disclosure.
Figure 6B:
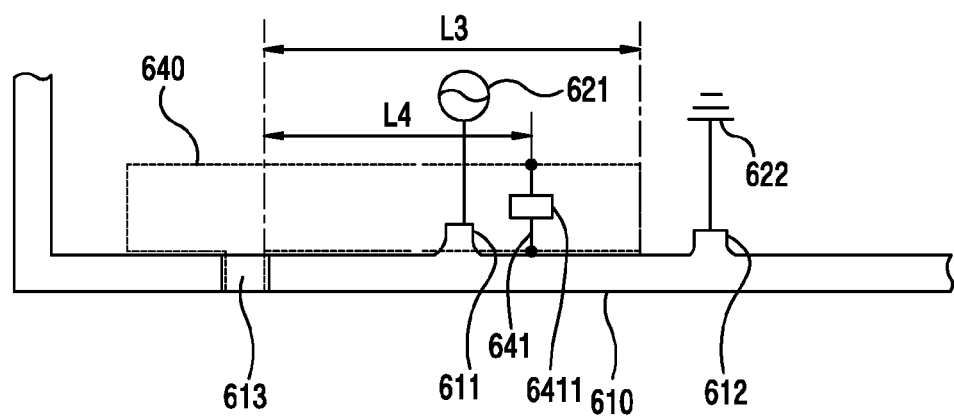

FIGS. 6A and 6B are diagrams illustrating a configuration of antenna devices that correspond to various lengths of slots, according to an embodiment of the present disclosure.

Conductive members 610 of FIGS. 6A and 6B may be similar to the first conductive member 511 of the first housing 510 of FIG. 5B. A slot 630 of FIG. 6A may be similar to the slot 5212 of FIG. 5B.

Referring to FIG. 6A, the conductive member 610 includes a feeding piece 611 disposed in a position spaced apart from a non-conductive member 613 by a predetermined distance and electrically connected with a feeding part 621 of a PCB and an electrical connection piece 612 spaced apart from the feeding piece 611 and electrically connected with a ground part 622 of the PCB. The slot 630 may be formed to have a length in a direction from the non-conductive member 613 to the feeding piece 611. The slot 630 may be provided in a position where the slot 630 is capable of being electrically coupled with the conductive member 610, which operates as an antenna radiator, without making contact with the conductive member 610.

The slot 630 may be formed to have a first electrical length L1 in the direction from the non-conductive member 613 to the feeding piece 611. In this case, the conductive member 610 may operate in a first operating frequency band that corresponds to the first electrical length L1 of the slot 630. The slot 630 may be formed to have a second electrical length L2 in the direction from the non-conductive member 613 to the feeding piece 611. In this case, the conductive member 610 may operate in a second operating frequency band that corresponds to the second electrical length L2 of the slot 630. In a case where the electrical length of the slot 630 decreases from L1 to L2, the operating frequency band of the conductive member 610, which operates as an antenna device, may shift from a low frequency band to a relatively high frequency band.

Referring to FIG. 6B, the conductive member 610 includes a feeding piece 611 disposed in a position spaced apart from a non-conductive member 613 by a predetermined distance and electrically connected with a feeding part 621 of a PCB and an electrical connection piece 612 spaced apart from the feeding piece 611 and electrically connected with a ground part 622 of the PCB. A slot 640 may be formed to have a length in a direction from the non-conductive member 613 to the feeding piece 611. The slot 640 may be provided in a position where the slot 640 is capable of being electrically coupled with the conductive member 610, which operates as an antenna radiator, without making contact with the conductive member 610.

The slot 640 may be formed to have a first electrical length L3 in the direction from the non-conductive member 613 to the feeding piece 611. In this case, the conductive member 610 may operate in a first operating frequency band that corresponds to the first electrical length L3 of the slot 640.

An electrical path 641 may be connected to the slot 640 in such a manner that the electrical path 641 crosses the slot 640 at a specific point, and a switch device 6411 may be provided on the electrical path 641. The electrical length of the slot 640 may vary from L3 to L4 by turning on/off the switch device 6411. Accordingly, the slot 640 may be formed to have the second electrical length L4 in the direction from the non-conductive member 613 to the feeding piece 611 while the switch device 6411 is turned on. In this case, the conductive member 610 may operate in a second operating frequency band that corresponds to the second electrical length L4 of the slot 640. In a case where the electrical length of the slot 640 decreases from L3 to L4 by means of the switch device 6411, the operating frequency band of the conductive member 610, which operates as an antenna device, may shift from a low frequency band to a relatively high frequency band.

Figure 7A:
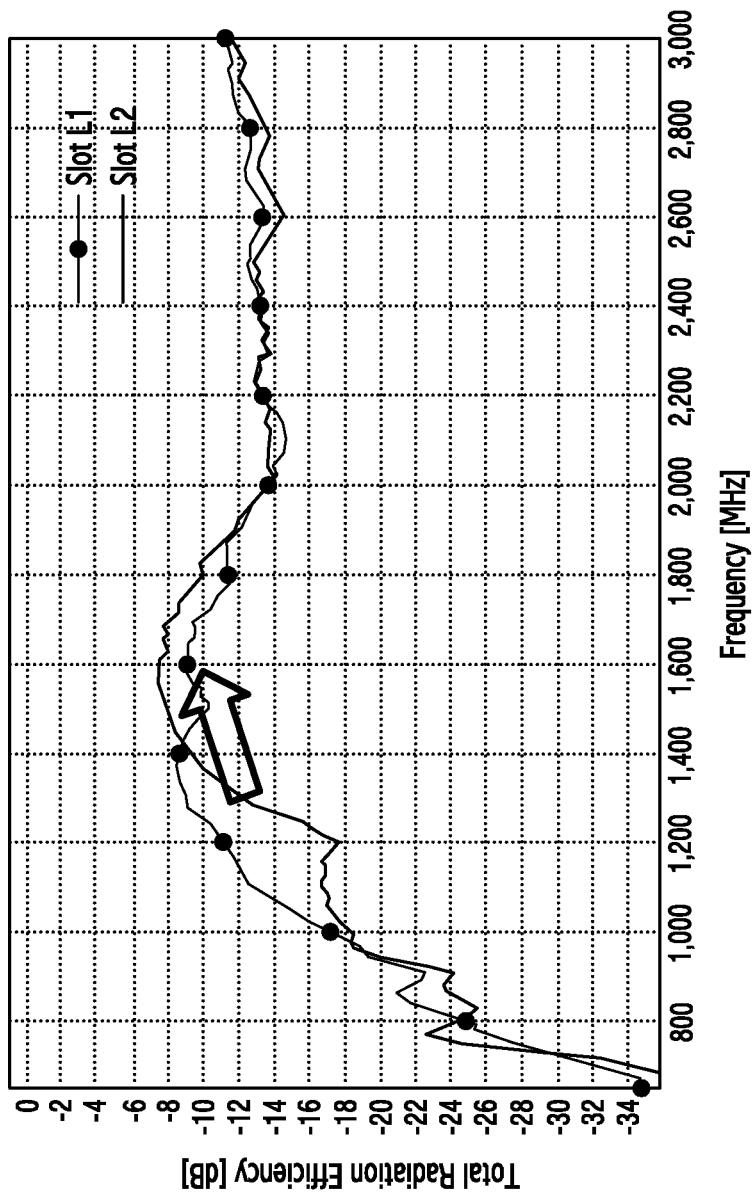
FIGS. 7A and 7B are graphs depicting radiation efficiency and standing wave ratios relevant to variations in an operating frequency bands of the antenna devices depending on the variations in the lengths of the slots according to the various embodiments of the present disclosure.
Figure 7B:
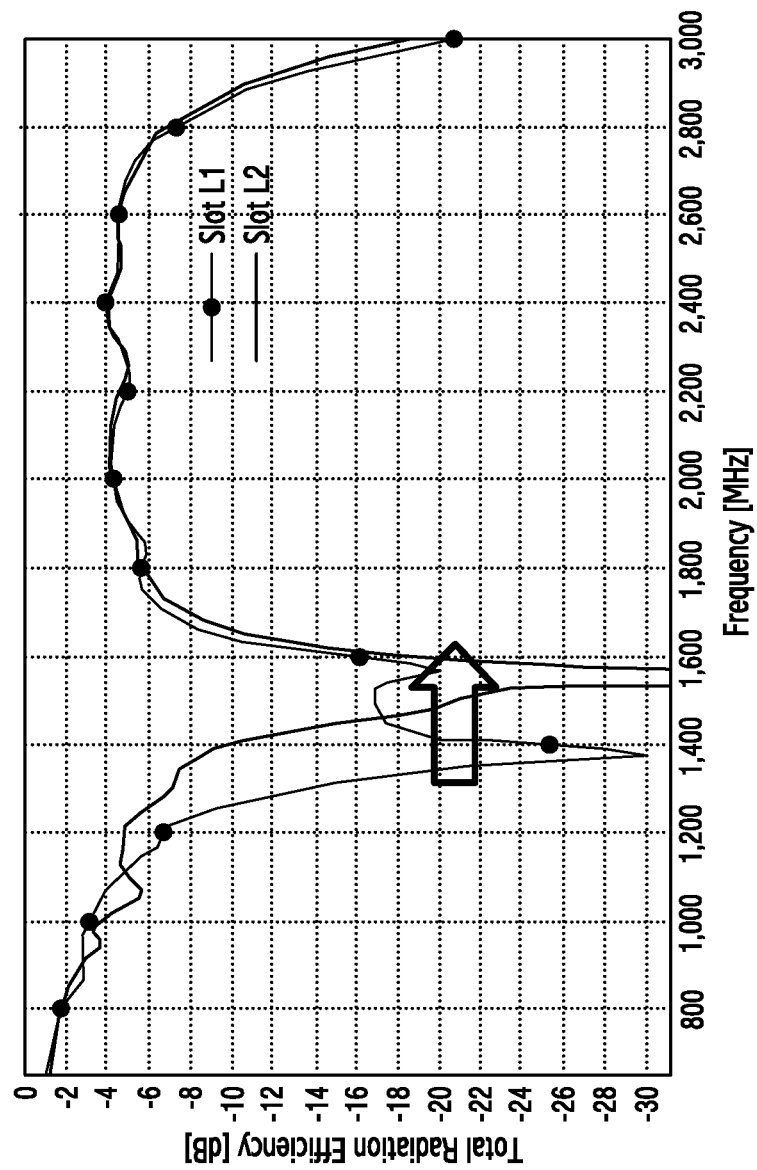

FIGS. 7A and 7B are graphs depicting radiation efficiency and standing wave ratios relevant to variations in the operating frequency bands of the antenna devices depending on the variations in the lengths of the slots, according to an embodiment of the present disclosure.

FIGS. 7A and 7B show that the conductive members, which operate as antenna devices, exhibit similar gains, and the operating frequency bands thereof shift from a 1400 MHz band to a 1575 MHz band when the lengths of the slots decrease, for example, when the electrical length of the slot 630 of FIG. 6A is varied from L1 to L2 and when the electrical length of the slot 640 of FIG. 6B is varied from L3 to L4 by turning on the switch device. Namely, the operating frequency bands of the conductive members, which are used as antenna radiators, shift from a low-frequency band to a relatively high frequency band as the lengths of the slots decrease.

The FIGs. provided hereinafter show electronic devices, each of which includes a first body and a second body that is able to rotate relative to the first body, and it will be obvious that when the first and second bodies cover each other, the radiation efficiency of antenna devices provided in one of the first and second bodies is improved by slots provided in corresponding positions in the other body, as described above.

Figure 8A:
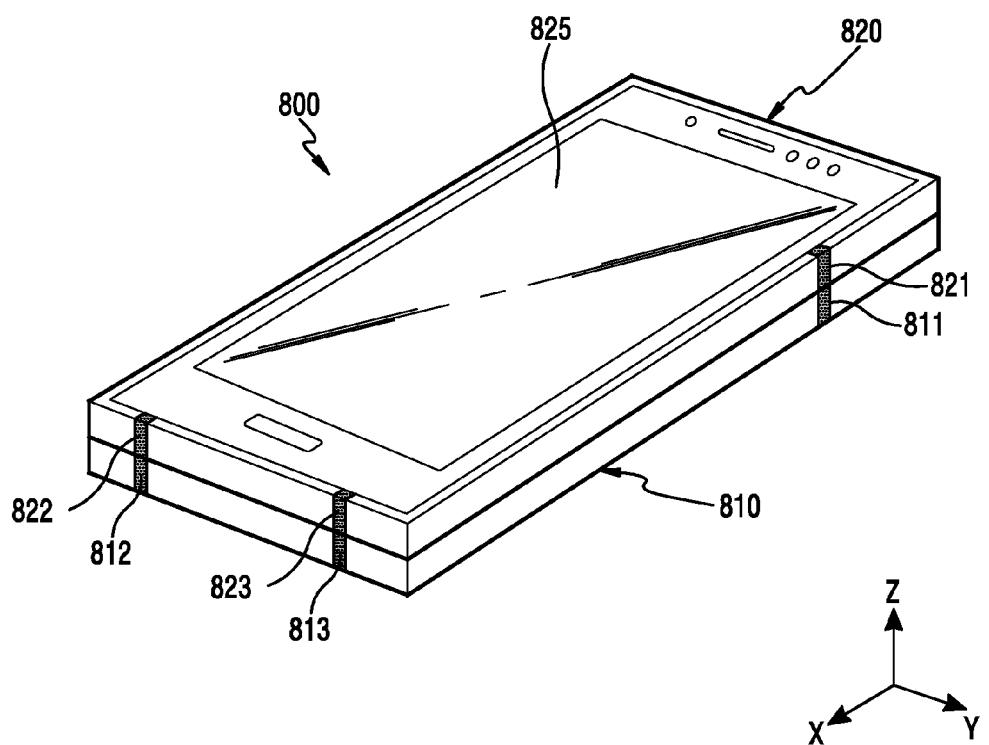
FIGS. 8A to 8C are diagrams illustrating a slide type electronic device, according to an embodiment of the present disclosure.
Figure 8B:
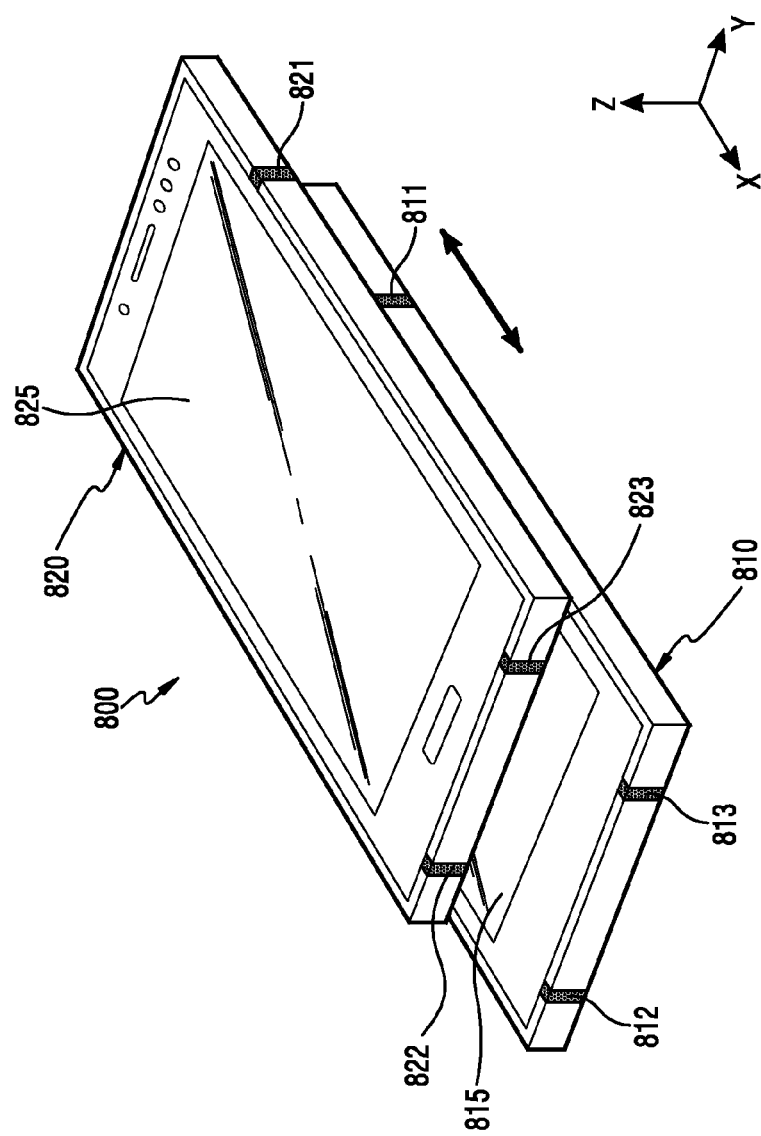
Figure 8C:
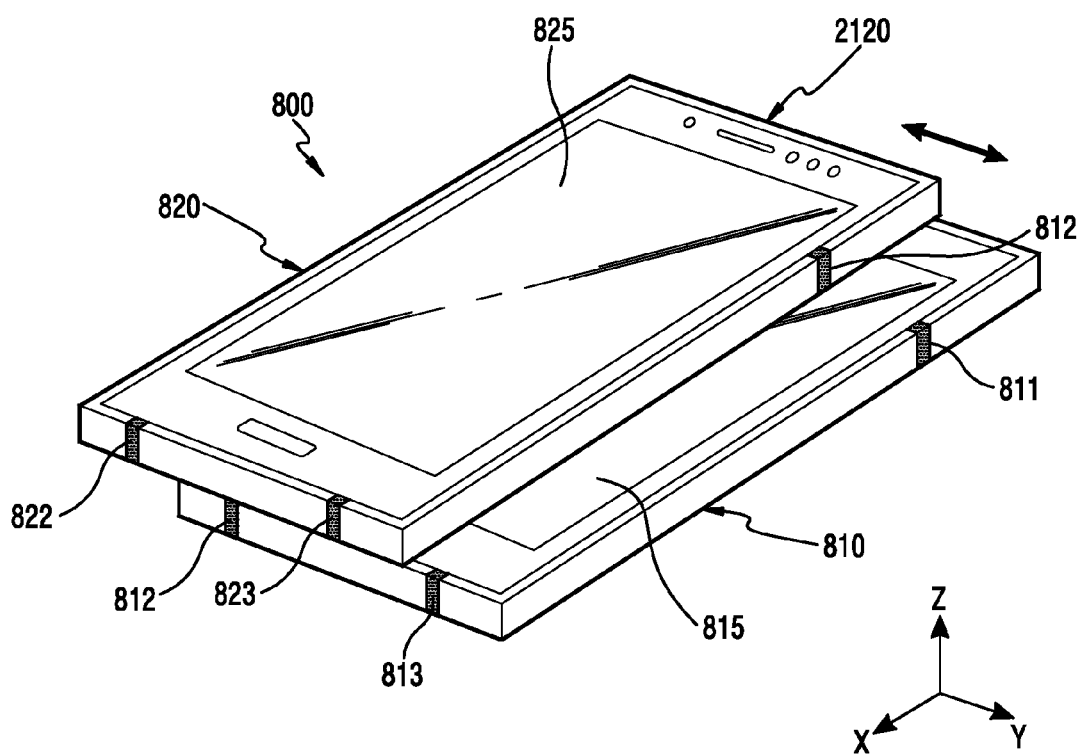

FIGS. 8A to 8C are diagrams illustrating a slide type electronic device 800, according to an embodiment of the present disclosure.

Referring to FIGS. 8A to 8C, the electronic device 800 includes a first body 810 and a second body 820 superposed on the first body 810. The second body 820 may slide on (or relative to) the first body 810. The second body 820 includes a first display 825 on the front surface thereof. The first body 810 includes a second display 815, at least a part of which is exposed when the second body 820 slides relative to the first body 810.

The second body 820 may slide relative to the first body 810 in the X-axis direction, as illustrated in FIG. 8B, or the second body 820 may slide relative to the first body 810 in the Y-axis direction, as illustrated in FIG. 8C. The first body 810 includes one or more non-conductive members 811, 812, and 813 provided along the outer periphery thereof. The second body 820 includes one or more non-conductive members 821, 822, and 823 provided along the outer periphery thereof. The non-conductive members 811, 812, and 813 of the first body 810 and the non-conductive members 821, 822, and 823 of the second body 820 may face each other when the second body 820 is superposed on the first body 810. Antenna devices may be provided near the non-conductive members of one of the first and second bodies 810 and 820, and slots may be provided near the non-conductive members of the other body to correspond to the antenna devices.

Figure 9A:
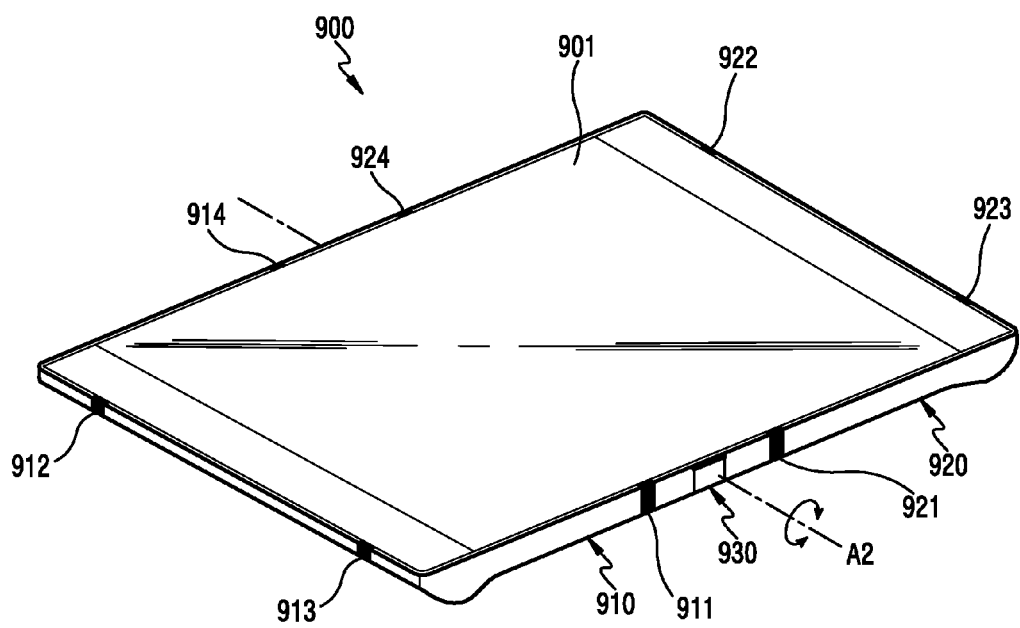
FIGS. 9A and 9B are diagrams illustrating a foldable electronic device that includes a flexible display, according to an embodiment of the present disclosure.
Figure 9B:
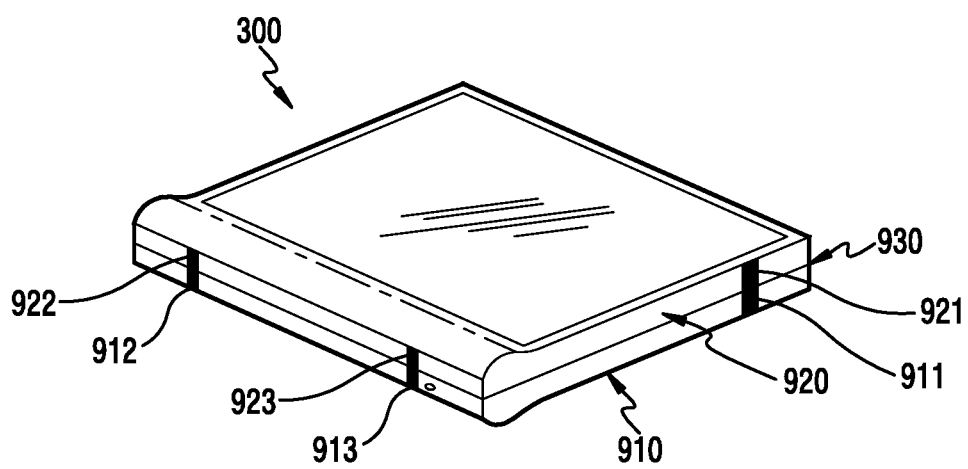

FIGS. 9A and 9B are diagrams illustrating a foldable electronic device 900 that includes a flexible display, according to an embodiment of the present disclosure.

Referring to FIGS. 9A and 9B, the electronic device 900 includes a first body 910 and a second body 920 disposed so as to be superposed on the first body 910. The second body 920 may be folded with respect to the first body 910. The first body 910 and the second body 920 may be folded toward each other such that the first and second bodies 910 and 920 face each other, and a flexible display 901 may be disposed on the surfaces of the first and second bodies 910 and 920 that face each other. The flexible display 901 may cover both the first body 910 and the second body 920, without seams. The second body 920 may be superposed on the first body 910 by rotating about the rotational axis A2 of a connecting device 930.

The first body 910 includes one or more non-conductive members 911, 912, 913, and 914 provided along the outer periphery thereof. The second body 920 includes one or more non-conductive members 921, 922, 923, and 924 provided along the outer periphery thereof. The non-conductive members 911, 912, 913, and 914 of the first body 910 and the non-conductive members 921, 922, 923, and 924 of the second body 920 may face each other when the second body 920 is superposed on the first body 910. Antenna devices may be provided near the non-conductive members of one of the first and second bodies 910 and 920, respectively, and slots may be provided near the non-conductive members of the other body to correspond to the antenna devices.

Figure 10A:
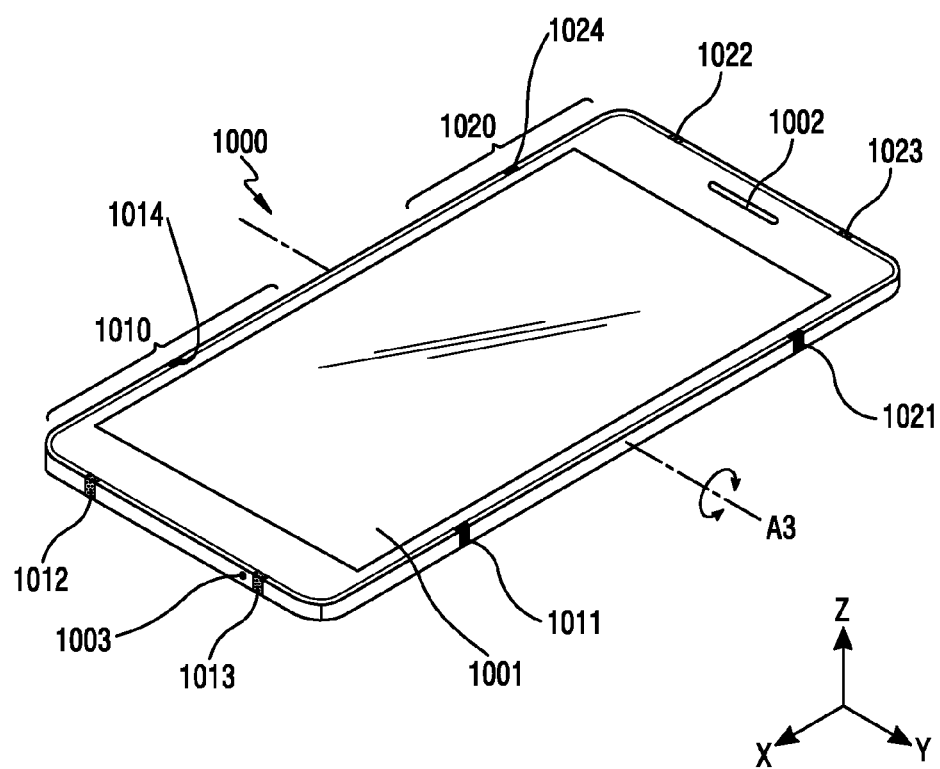
FIGS. 10A to 10C are diagrams illustrating a bendable electronic device that includes a flexible display, according to an embodiment of the present disclosure.
Figure 10B:
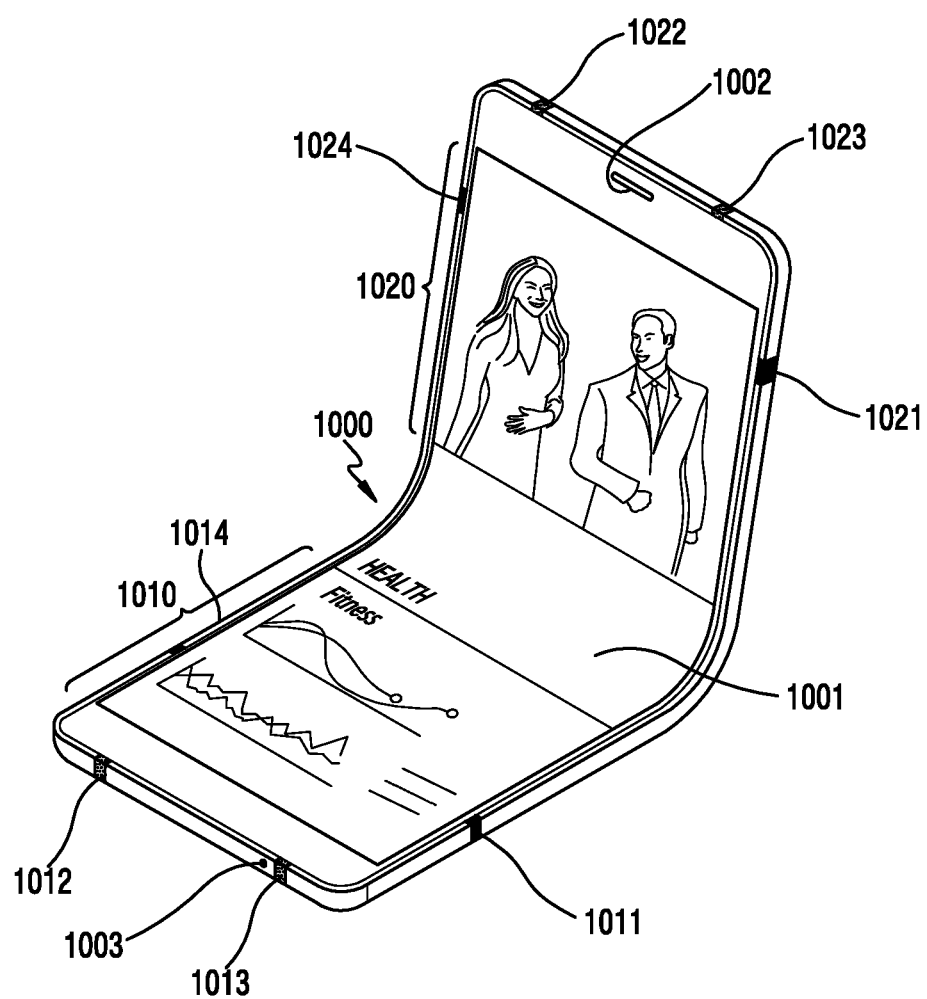
Figure 10C:
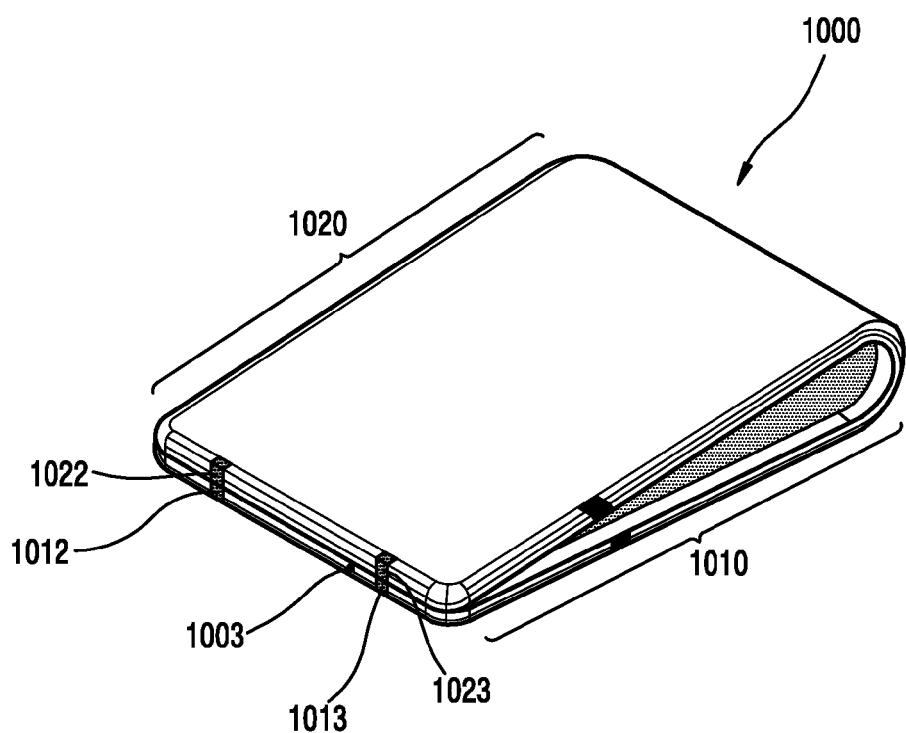

FIGS. 10A to 10C are diagrams illustrating a bendable electronic device that includes a flexible display, according to an embodiment of the present disclosure.

Referring to FIGS. 10A to 10C, the electronic device 1000 may be constituted by a single body. The electronic device 1000 may be an electronic device for communication that includes a speaker device 1002 and a microphone device 1003. The electronic device 1000 may be bent with respect to the lateral axis A3 thereof that serves as a rotational axis, in which case a first area 1010 and a second area 1020 may be separated from each other with respect to the axis A3. The first area 1010 and the second area 1020 may face each other by when the electronic device is in a bent configuration. The electronic device 1000 may include one flexible display 1001 that covers both the first area 1010 and the second area 1020. The second area 1020 may be superposed on the first area 1010 by rotating about the rotational axis A3, with no separate connecting device.

The first area 1010 includes one or more non-conductive members 1011, 1012, 1013, and 1014 provided along the outer periphery thereof. The second area 1020 includes one or more non-conductive members 1021, 1022, 1023, and 1024 provided along the outer periphery thereof. The non-conductive members 1011, 1012, 1013, and 1014 of the first area 1010 and the non-conductive members 1021, 1022, 1023, and 1024 of the second area 1020 may face each other when the second area 1020 is superposed on the first area 1010. Antenna devices may be provided near the non-conductive members of one of the first and second areas 1010 and 1020, and slots may be provided near the non-conductive members of the other area to correspond to the antenna devices.

Figure 11A:
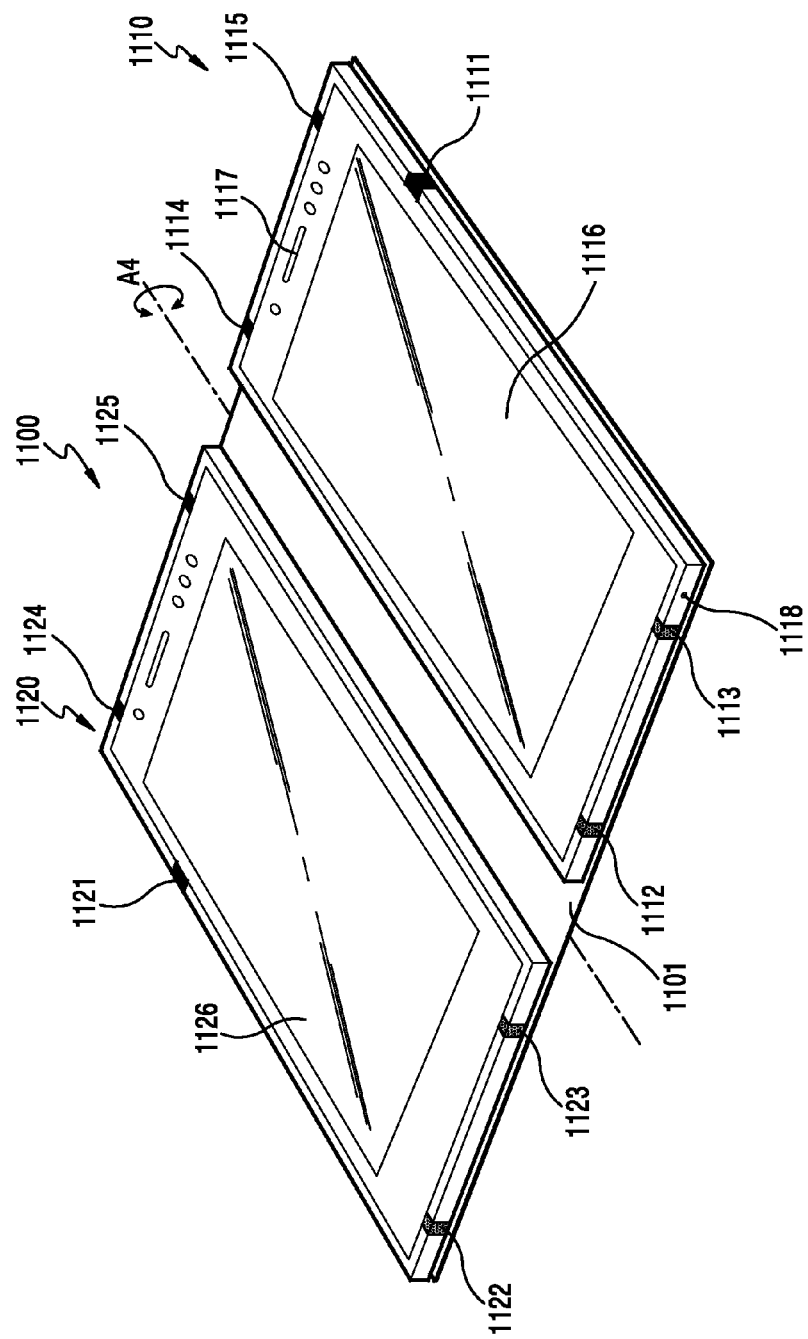
FIGS. 11A and 11B are diagrams illustrating a foldable electronic device, according to an embodiment of the present disclosure.
Figure 11B:
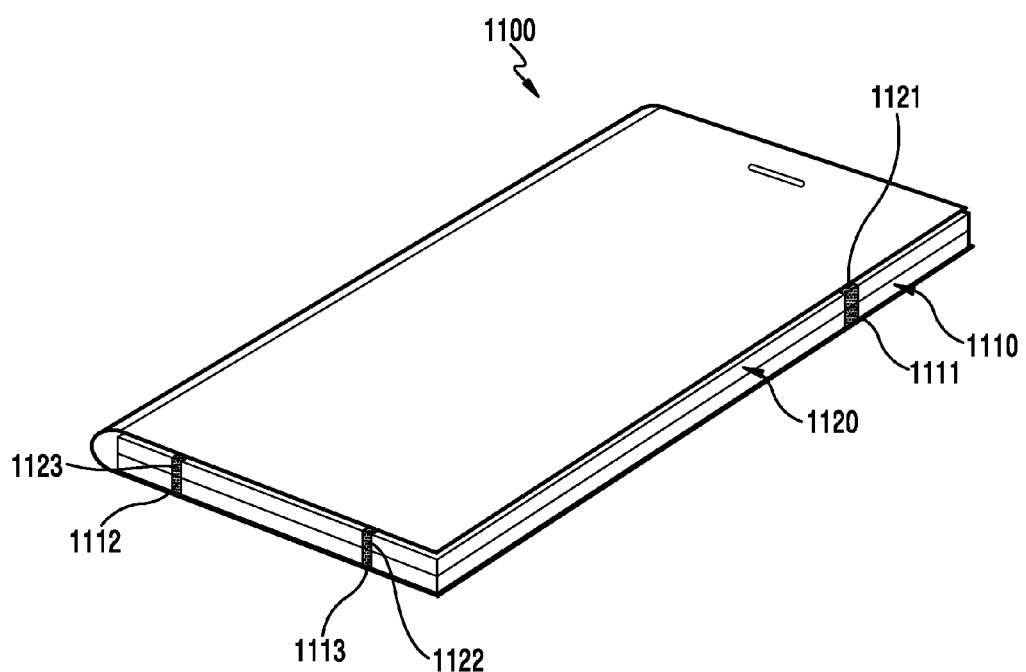

FIGS. 11A and 11B are diagrams illustrating a foldable electronic device 1100, according to an embodiment of the present disclosure.

Referring to FIGS. 11A and 11B, the electronic device 1100 includes a first electronic device 1110 and a second electronic device 1120 disposed so as to be superposed on the first electronic device 1110. The first and second electronic devices 1110 and 1120 may be disposed on a connecting member 1101 that is folded about the axis A4 thereof. The electronic device 1110 may be an electronic device for communication that includes a first display 1116, a speaker device 1117, and a microphone device 1118. The second electronic device 1120 includes a second display 1126 that assists with the first electronic device 1110. The first and second electronic devices 1110 and 1120 may be functionally connected with each other through the connecting member 1101. However, the first and second electronic devices 1110 and 1120 may be functionally connected with each other through wireless communication (e.g., BT communication, etc.). The first electronic device 1110 may be superposed on the second electronic device 1120 by rotating about the rotational axis A4 of the connecting member 1101.

The first electronic device 1110 includes one or more non-conductive members 1111, 1112, 1113, 1114, and 1115 provided along the outer periphery thereof. The second electronic device 1120 includes one or more non-conductive members 1121, 1122, 1123, 1124, and 1125 provided along the outer periphery thereof. The non-conductive members 1111, 1112, 1113, 1114, and 1115 of the first electronic device 1110 and the non-conductive members 1121, 1122, 1123, 1124, and 1125 of the second electronic device 1120 may face each other when the second electronic device 1120 is superposed on the first electronic device 1110 by the connecting member. Antenna devices may be provided near the non-conductive members of one of the first and second electronic devices 1110 and 1120, and slots may be provided near the non-conductive members of the other electronic device to correspond to the antenna devices.

Figure 12A:
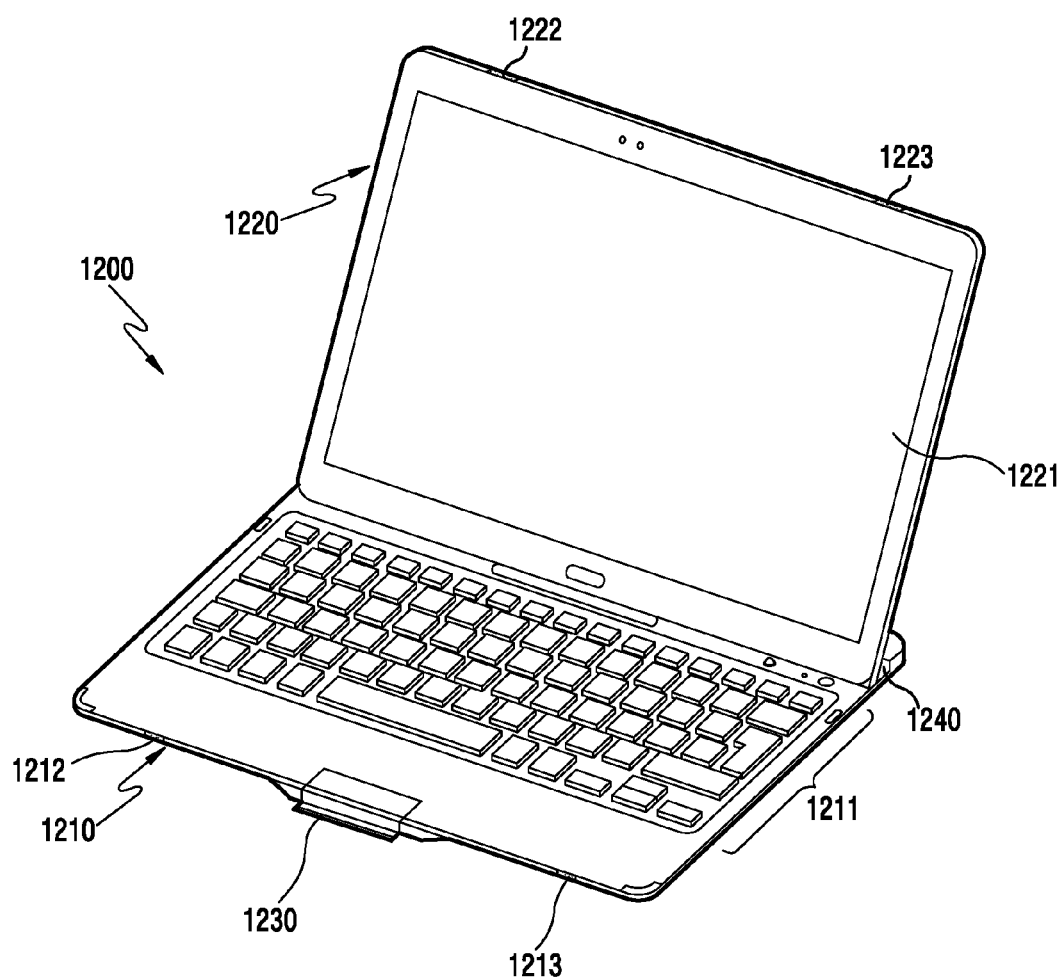
FIGS. 12A and 12B are diagrams illustrating a detachable electronic device, according to an embodiment of the present disclosure.
Figure 12B:
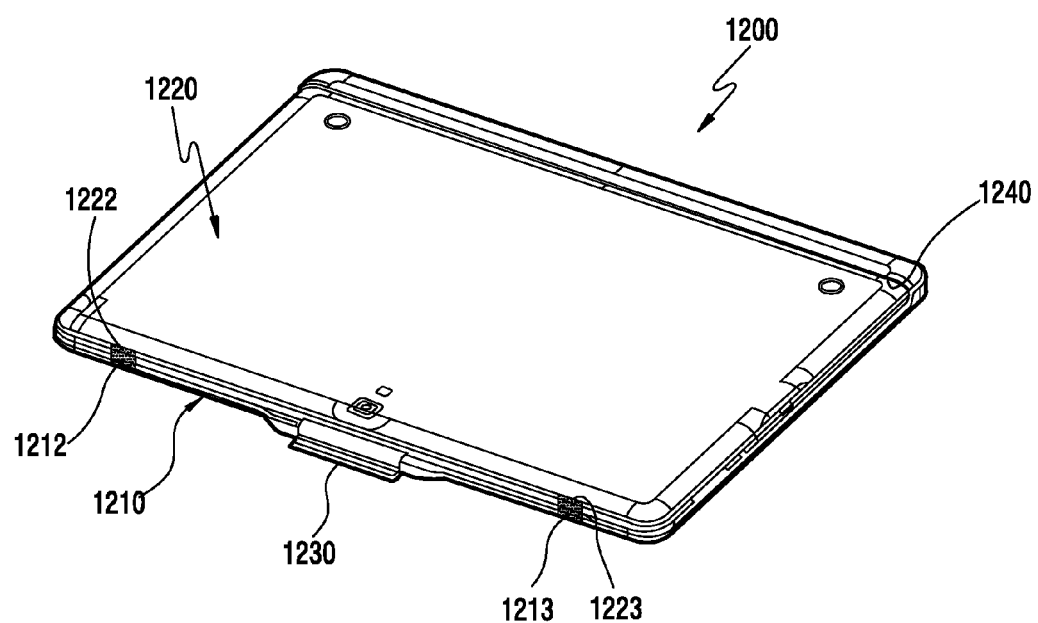

FIGS. 12A and 12B are diagrams illustrating a detachable electronic device 1200, according to an embodiment of the present disclosure.

Referring to FIGS. 12A and 12B, the electronic device 1200 includes a first electronic device 1210 and a second electronic device 1220 disposed so as to be detached from the first electronic device 1210. The first electronic device 1210 may be a keypad 1211 that includes a plurality of key buttons. The second electronic device 1220 includes a display 1221. The first and second electronic devices 1210 and 1220 may be functionally connected with each other through wireless communication (e.g., BT communication, etc.). The electronic device 1200 may be carried while the second electronic device 1220 is superposed on the first electronic device 1210 and secured to the first electronic device 1210 by a stopper 1240 provided on the first electronic device 1210 and a locking device 1230 opposite to the stopper 1240.

The first electronic device 1210 includes one or more non-conductive members 1212 and 1213 provided along the outer periphery thereof. The second electronic device 1220 includes one or more non-conductive members 1222 and 1223 provided along the outer periphery thereof. The non-conductive members 1212 and 1213 of the first electronic device 1210 and the non-conductive members 1222 and 1223 of the second electronic device 1220 may face each other when the second electronic device 1120 is superposed on the first electronic device 1110. Antenna devices may be provided near the non-conductive members of one of the first and second electronic devices 1210 and 1220, and slots may be provided near the non-conductive members of the other electronic device to correspond to the antenna devices.

In the various embodiments described above, more or fewer non-conductive members may be provided in each of the electronic devices, and may be disposed in various positions in or along the electronic device.

An electronic device, may include: a first housing that includes a first surface, a second surface opposite to the first surface, and a first side surface at least partially surrounding the space between the first surface and the second surface; a second housing that includes a first surface oriented to face the first surface of the first housing, a second surface opposite to the first surface, and a second side surface at least partially surrounding the space between the first surface and the second surface; a connecting part that connects the first housing and the second housing; a communication circuit within at least one of the first housing and the second housing; a first conductive member that extends along at least a part of the first side surface and includes at least one gap for electrically separating segments thereof; a first non-conductive member at least partially filling the at least one gap of the first conductive member; a second conductive member that extends along at least a part of the second side surface and includes at least one gap for electrically separating segments thereof; and a second non-conductive member at least partially filling the at least one gap of the second conductive member. The first conductive member of the first housing and the communication circuit may be electrically connected with each other to operate as an antenna, and a slot having a predetermined length may be provided in an area that is capable of being coupled with the first conductive member of the second housing that overlaps the antenna while the first surface of the second housing faces the first surface of the first housing.

The first and second non-conductive members may be configured to be substantially aligned with each other when viewed from a side of the first or second housing while the first surface of the second housing faces the first surface of the first housing.

The communication circuit may be electrically connected with a first part of the first conductive member that is spaced apart from the first non-conductive member by a predetermined distance.

The electronic device may further include a ground member in at least one of the first and second housings, and the ground member may be electrically connected with a second part of the first conductive member that is spaced apart from the first part of the first conductive member by a predetermined distance in the opposite direction of the first non-conductive member.

The slot may be formed to have a space directed toward the first part from the second non-conductive member.

An operating frequency band of the first conductive member used as an antenna may be regulated by adjusting at least one of the width and length of the slot.

The electrical length of the slot may be adjusted by an electrical path crossing the slot.

A switch may be provided on the electrical path to vary the operating frequency band by means of a switching operation thereof.

The slot may be filled with the same material as that of the second non-conductive member.

The first and second housings may be connected with each other using a foldable type configuration, a slide type configuration, a bendable type configuration, or a detachable type configuration.

An electronic device, according to various embodiment, may include: a first housing having at least one antenna therein; a second housing, at least a part of which is formed of a first conductive member; and a connecting part that connects the first housing and the second housing, and a slot having a predetermined length may be provided in the conductive member area of the second housing that overlaps the antenna and is capable of being coupled with the antenna while the first housing and the second housing face each other.

The first housing may further include a PCB having a communication circuit therein, and the antenna may be formed to be a pattern on the PCB and may be electrically connected to the communication circuit.

The first housing may further include a PCB having a communication circuit therein, and the antenna may be mounted on an antenna carrier disposed in the first housing and may be electrically connected to the communication circuit.

The first housing may further include a second conductive member in a position corresponding to the first conductive member of the second housing, and the second conductive member may be electrically connected to the communication circuit in a position corresponding to the slot.

The electronic device may further include a first non-conductive member that at least partially fills at least one gap formed in the first conductive member and a second non-conductive member that at least partially fills at least one gap formed in the second conductive member, and the second conductive member of the first housing that is electrically separated by the second non-conductive member may be electrically connected with the communication circuit to operate as an antenna.

T first and second non-conductive members may be configured to be substantially aligned with each other while the second housing faces the firs housing.

The communication circuit may be electrically connected with a first part of the second conductive member that is spaced apart from the second non-conductive member by a predetermined distance.

The electronic device may further include a ground member in at least one of the first and second housings, and the ground member may be electrically connected with a second part of the second conductive member that is spaced apart from the first part of the second conductive member by a predetermined distance in the opposite direction of the second non-conductive member.

The slot may be formed to have a space directed toward the first part from the first non-conductive member.

The operating frequency band of the antenna may be regulated by adjusting the length of the slot.

An electronic device, according to various embodiments, may include: a first housing that includes a first surface, a second surface opposite to the first surface, and a first side surface at least partially surrounding the space between the first surface and the second surface; a second housing that includes a first surface oriented to face the first surface of the first housing, a second surface opposite to the first surface, and a second side surface at least partially surrounding the space between the first surface and the second surface; a connecting part that connects the first housing and the second housing; a first conductive member that extends along at least a part of the first side surface and includes at least one gap for electrically separating segments thereof; a first non-conductive member at least partially filling the at least one gap of the first conductive member; a second conductive member that extends along at least a part of the second side surface and includes at least one gap for electrically separating segments thereof; a second non-conductive member at least partially filling the at least one gap of the second conductive member and substantially aligned with the first non-conductive member when viewed from a side of the first or second housing while the first surface of the second housing faces the first surface of the first housing; a communication circuit disposed within at least one of the first and second housings and electrically connected with a first point of the first conductive member of the first housing; a non-conductive region that has a second length substantially corresponding to a first length from the first point of the first conductive member to the first non-conductive member and extends along the second conductive member in the second housing in the longitudinal direction, and is adjacent to the second non-conductive member; and a conductive region that surrounds the non-conductive region.

The area from the first point of the first conductive member to the first non-conductive member may at least partially face the non-conductive area when the first surface of the second housing faces the first surface of the first housing.

At least some of the non-conductive region, the conductive region, and the second conductive member may form an antenna member for the communication circuit.

The electronic device may further include a ground member in at least one of the first and second housings, and the ground member may be electrically connected with a second part of the first conductive member that is spaced apart from the first part of the first conductive member by a predetermined distance in the opposite direction of the first non-conductive member.

The non-conductive region may be formed to have a space directed toward the first part from the second non-conductive member.

The operating frequency band of the first conductive member used as an antenna may be regulated by adjusting at least one of the width and length of the non-conductive region.

Figure 13A:
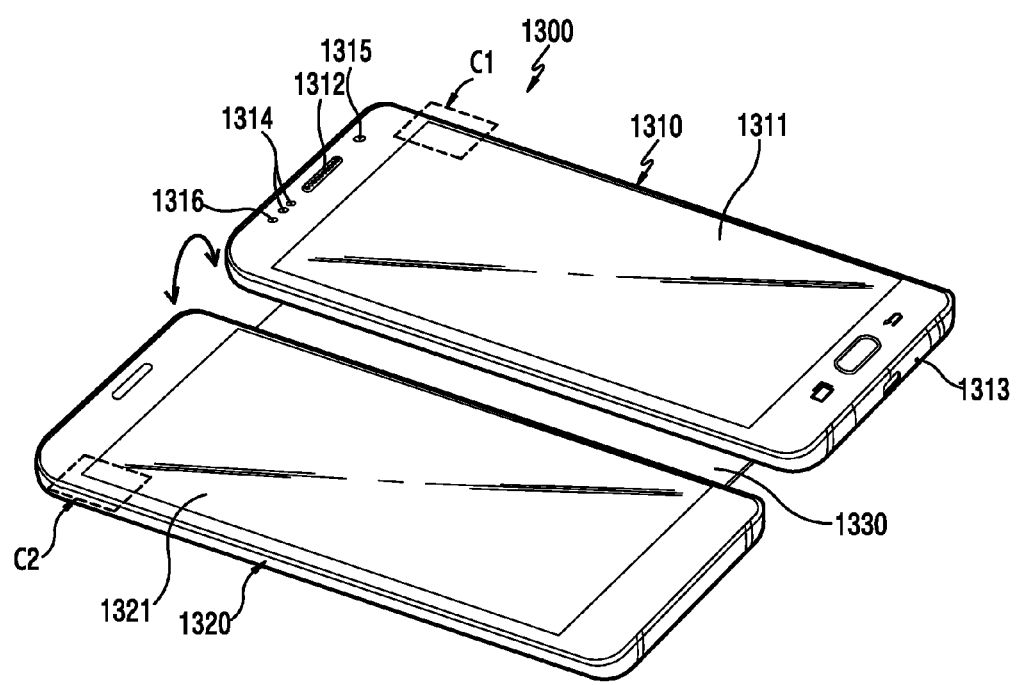
FIG. 13A is a perspective view of an electronic device, according to an embodiment of the present disclosure.
Figure 13B:
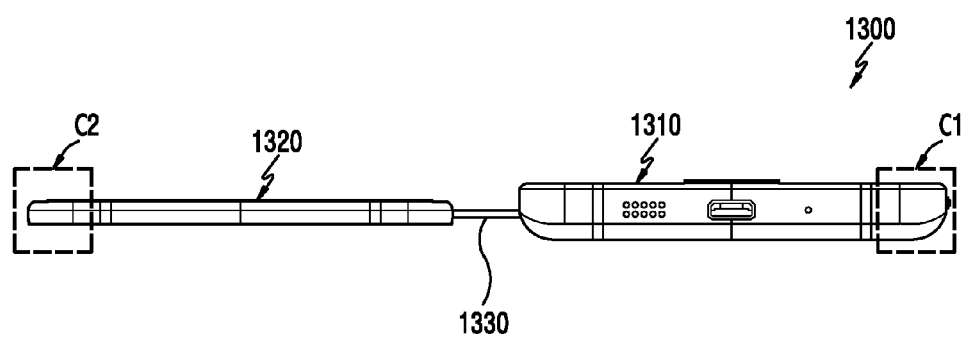
FIGS. 13B to 13D are diagrams illustrating various operating states of the electronic device, according to the an embodiment of the present disclosure.
Figure 13C:
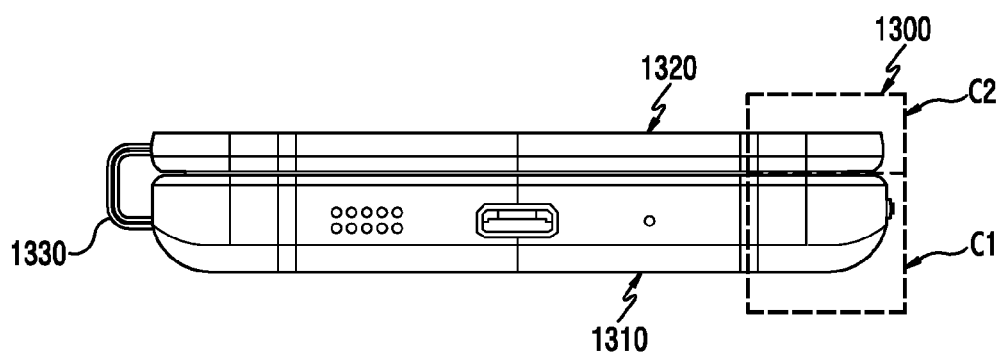
Figure 13D:
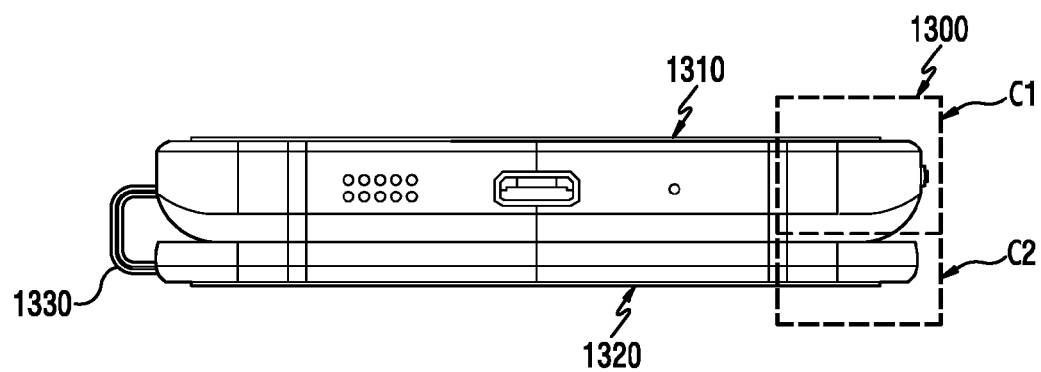

FIG. 13A is a perspective view of an electronic device 1300, according to an embodiment of the present disclosure. FIGS. 13B to 13D are diagrams illustrating various operating states of the electronic device 1300, according to the an embodiment of the present disclosure.

Referring to FIG. 13A, the electronic device 1300 includes a first body 1310 and a second body 1320 that may be folded with respect to the first body 1310 by rotating about a connecting member 1330, in which case the second body 1320 may be superposed on the first body 1310.

The first body 1310 includes a first display 1311. A speaker device 1312 may be disposed on the upper side of the first display 1311, and a microphone device 1313 may be disposed on the lower side of the first display 1311. Components for performing various functions of the electronic device 1300 may be arranged around the speaker device 1312. The components may include at least one sensor module 1314. The sensor module 1314 may include, for example, at least one of an illuminance sensor (e.g., an optical sensor), a proximity sensor, an infrared sensor, and an ultrasonic sensor. The components may also include a camera device 1315, and an LED indicator 1316 for informing a user of status information of the electronic device 1300.

The second body 1320 includes a second display 1321. The second display 1321 may face the first display 1311 when the second body 1320 of the electronic device 1300 is superposed on the first body 1310. The first and second displays 1311 and 1321 may include touch screen devices that include touch sensors.

FIG. 13B illustrates an open state in which the second body 1320 is unfolded away from the first body 1310, FIG. 13C illustrates a closed state in which the second body 1320 is superposed on the first body 1310, and FIG. 13D illustrates a back folding state in which rear surfaces of the first and second bodies 1310 and 1320 make contact with each other. An antenna radiator may be disposed, as a conductive element, in an area C1 of the first body 1310. The second body 1320 may be formed of a conductive material, or may include a conductive element. An area C2 of the second body 1320 superposed on the first body 1310 may include an opening (e.g., reference numeral 1451 of FIG. 14) for preventing a degradation in the radiation efficiency of the antenna radiator disposed in the area C1.

The opening may be provided in a position where the opening is electrically coupled with coupleable to the antenna radiator when the second body 1320 is superposed on the first body 1310. The opening may be formed to have an optimum electrical length along an outer periphery thereof to correspond to the operating frequency band of the antenna radiator. The opening may be formed to have an electrical length of $\lambda$ along the outer periphery thereof in a case where the antenna radiator operates in a 2.4 GHz band. The opening may be provided such that the antenna radiator is included therein.

Figure 14:
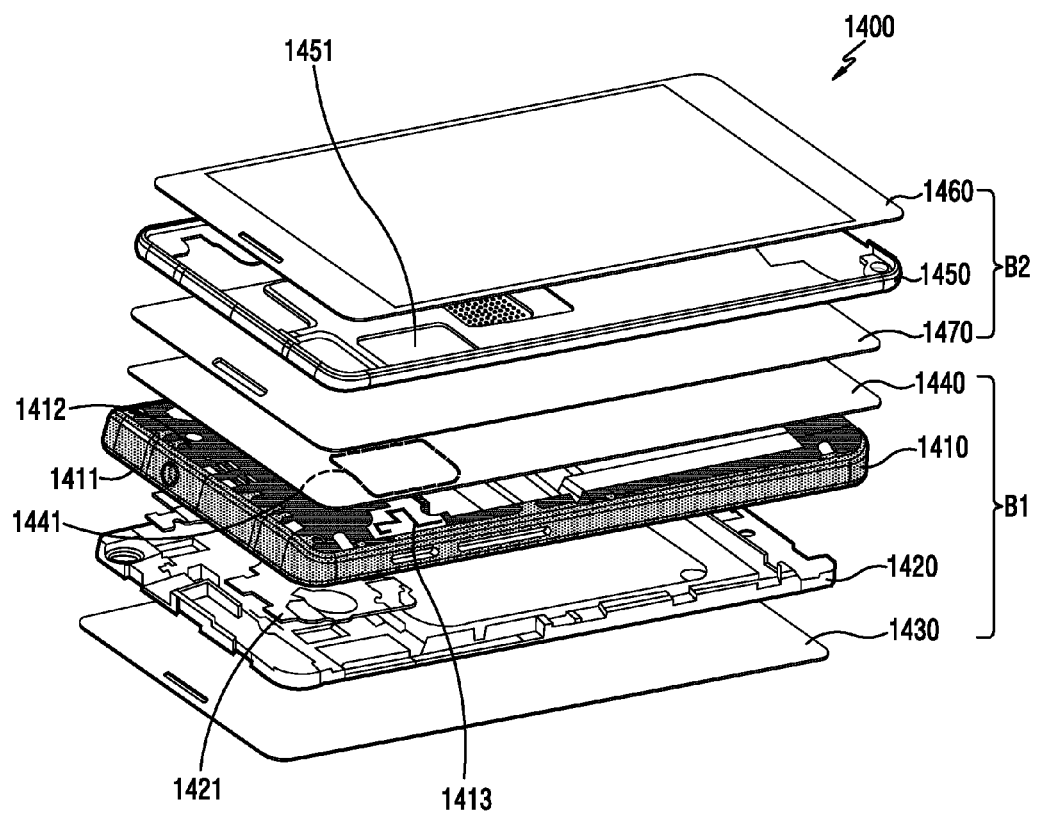
FIG. 14 is an exploded perspective view of an electronic device, according to an embodiment of the present disclosure.

FIG. 14 is an exploded perspective view of an electronic device 1400, according to an embodiment of the present disclosure.

The electronic device 1400 of FIG. 14 may be similar to the electronic device 1300 of FIG. 13A.

Referring to FIG. 14, the electronic device 1400 includes a first body B1 and a second body B2 that is able to rotate relative to the first body B1 by means of a connecting member (corresponding to the connecting member 1330 of FIG. 13).

The first body B1 includes a first housing 1410, a first display 1430 disposed on a first surface 1411 of the first housing 1410 in a first direction, and a first rear cover 1440 disposed on a second surface 1412 of the first housing 1410 in a second direction opposite to the first direction. A first conductive element 1413 may be disposed on the second surface 1412 of the first housing 1410. The first conductive element 1413 may be electrically connected with a wireless communication circuit of the electronic device 1400 and may be used as an antenna radiator. At least a part of the first housing 1410 may include a metal member and an injection-molded member. The metal member and the injection-molded member of the first housing 1410 may be integrally formed with each other by double injection molding or insert molding. The first conductive element 1413 may be disposed on the injection-molded member. However, the first conductive element 1413 may include at least a part of the metal member that is used as an antenna radiator.

The second body B2 includes a second housing 1450, a second display 1460 disposed on a third surface of the second housing 1450 that is directed in a third direction, and a second rear cover 1470 disposed on a fourth surface of the second housing 1450 that is directed in a fourth direction opposite to the third direction. The second housing 1450 may be used as an intermediate plate made of a metal material. The second housing 1450 may also be formed only by a metal member, or may be formed by a metal member and an injection-molded member that are formed through double injection molding. An opening 1451 may be formed in the second housing 1450 to overlap the first conductive element 1413 disposed on the first housing 1410 when the second body B2 is superposed on the first body B1. The opening 1451 may be located in a position where the opening 1451 is capable of being electrically coupled with the first conductive element 1413. The opening 1451 may be provided in the corresponding position to surround the first conductive element 1413. The opening 1451, when formed in the second housing 1450 and made of a metal material, may be used as a parasitic antenna member with the outer periphery thereof as an electrical length. The opening 1451 with the outer periphery thereof as an electrical length may have various sizes and shapes according to applied operating frequency bands of the first conductive element 1413.

A second conductive element 1441 may be provided on the first rear cover 1440, which is disposed on the first housing 1410, to overlap the first conductive element 1413. The second conductive element 1441 may be disposed so as to be electrically coupled with the first conductive element 1413 and may be used as a parasitic antenna device to help to improve the radiation efficiency of the first conductive element 1413 when the second body B2 is not superposed on the first body B1 (when the second body and the first body are in an unfolded configuration).

Figure 15A:
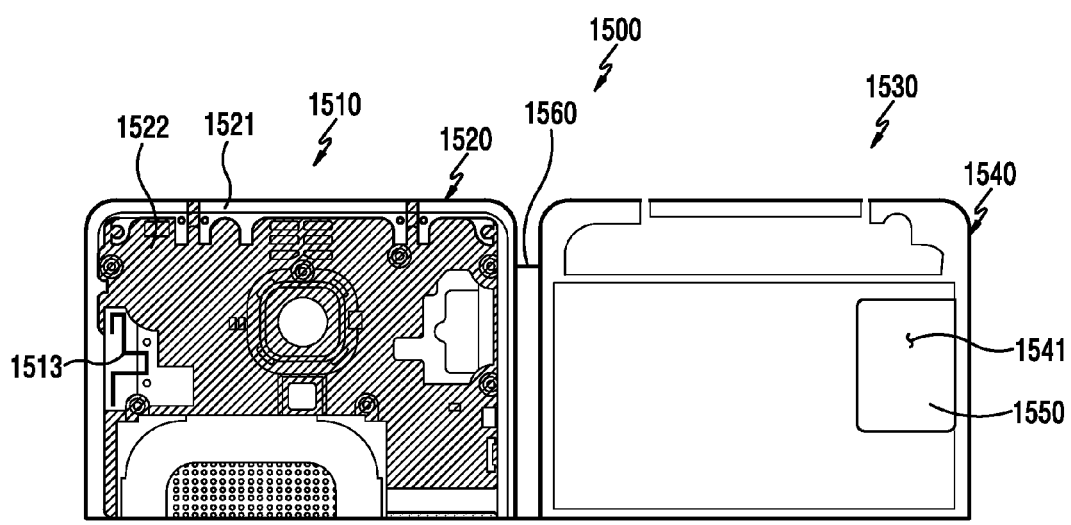
FIGS. 15A and 15B are diagrams illustrating an arrangement relation between a first conductive element and an opening according to an operation of opening/closing an electronic device, according to an embodiment of the present disclosure.
Figure 15B:
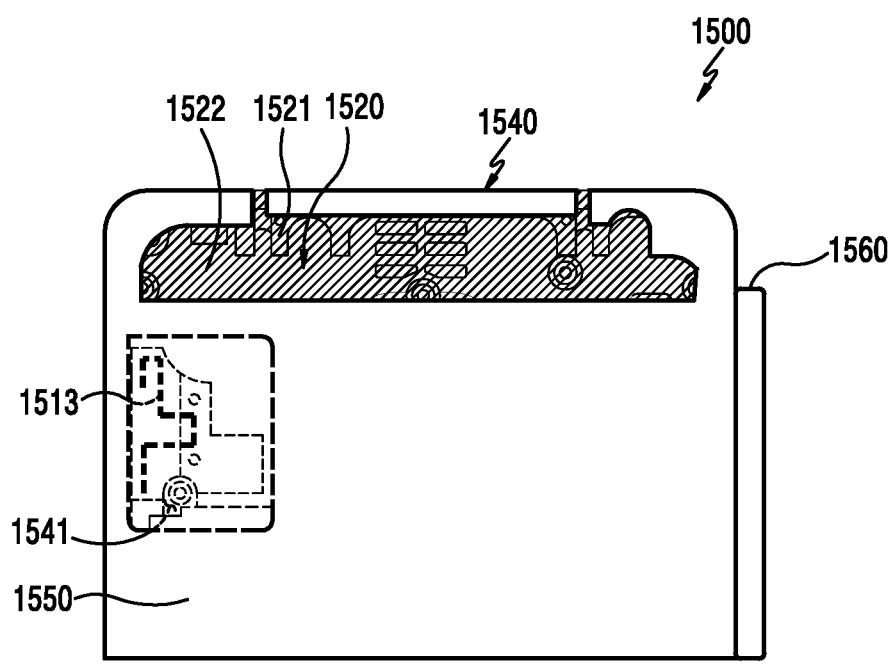

FIGS. 15A and 15B are diagrams illustrating an arrangement relation between a first conductive element 1513 and an opening 1541 according to an operation of opening/closing an electronic device 1500, according to an embodiment of the present disclosure.

The electronic device 1500 of FIGS. 15A and 15B may be similar to the electronic device 1300 of FIGS. 13A to 13D or the electronic device 1400 of FIG. 14.

Referring to FIGS. 15A and 15B, the electronic device 1500 includes a first body 1510 and a second body 1530 that performs opening/closing operations in such a manner that the second body 1530 is folded toward, and unfolded away from, the first body 1510 by a connecting member 1560. The first body 1510 includes a first housing 1520, and the second body 1530 includes a second housing 1540. The first housing 1520 includes a metal member 1521 and an injection-molded member 1522 that are integrally formed with each other by double injection molding. The metal member 1521 may be applied to at least a part of the outer periphery of the first body 1510. The first conductive element 1513 may be disposed in the area of the injection-molded member of the first housing 1520. The first conductive element 1513 may be electrically connected with a wireless communication circuit included in the first body 1510. The first conductive element 1513 may be formed in a predetermined pattern, and may or may not be exposed through the injection-molded member of the first housing 1520. However, the first conductive element 1513 may be formed in a pattern type on a PCB disposed inside the first housing 1520, or may be disposed on an antenna carrier that has a height and is disposed inside the first housing 1520.

The second body 1530 includes the second housing 1540 that is formed of a metal member or has a metal member applied to at least a part thereof. In a case where the second housing 1540 is formed of a metal member, the second housing 1540 may be used as a metal reinforcing plate for protecting a display module 1550. The second housing 1540 may also be used as an intermediate plate that constitutes the second body 1530.

The opening 1541 may be formed in the second housing 1540 to overlap the first conductive element 1513 formed on the first housing 1520, in a case where the first body 1510 and the second body 1530 are folded to each other. The opening 1541 may be provided in a corresponding position of the second housing 1540 that is capable of being electrically coupled with the first conductive element 1513, in a case where the first body 1510 and the second body 1530 are folded to each other. The opening 1541 may surround the first conductive element 1513 when the first body 1510 and the second body 1530 are folded to each other. The opening 1541 may be formed to have an electrical length along the outer periphery thereof to correspond to the operating frequency band of the first conductive element 1513. The opening 1541 may be formed to have an electrical length of λ along the outer periphery thereof in a case where the first conductive element 1513 operates in a 2.4 GHz band. The opening 1541 may be provided such that at least a part of the first conductive element 1513 is included therein. The opening 1541 may be finished by an injection-molded member.

Figure 16A:
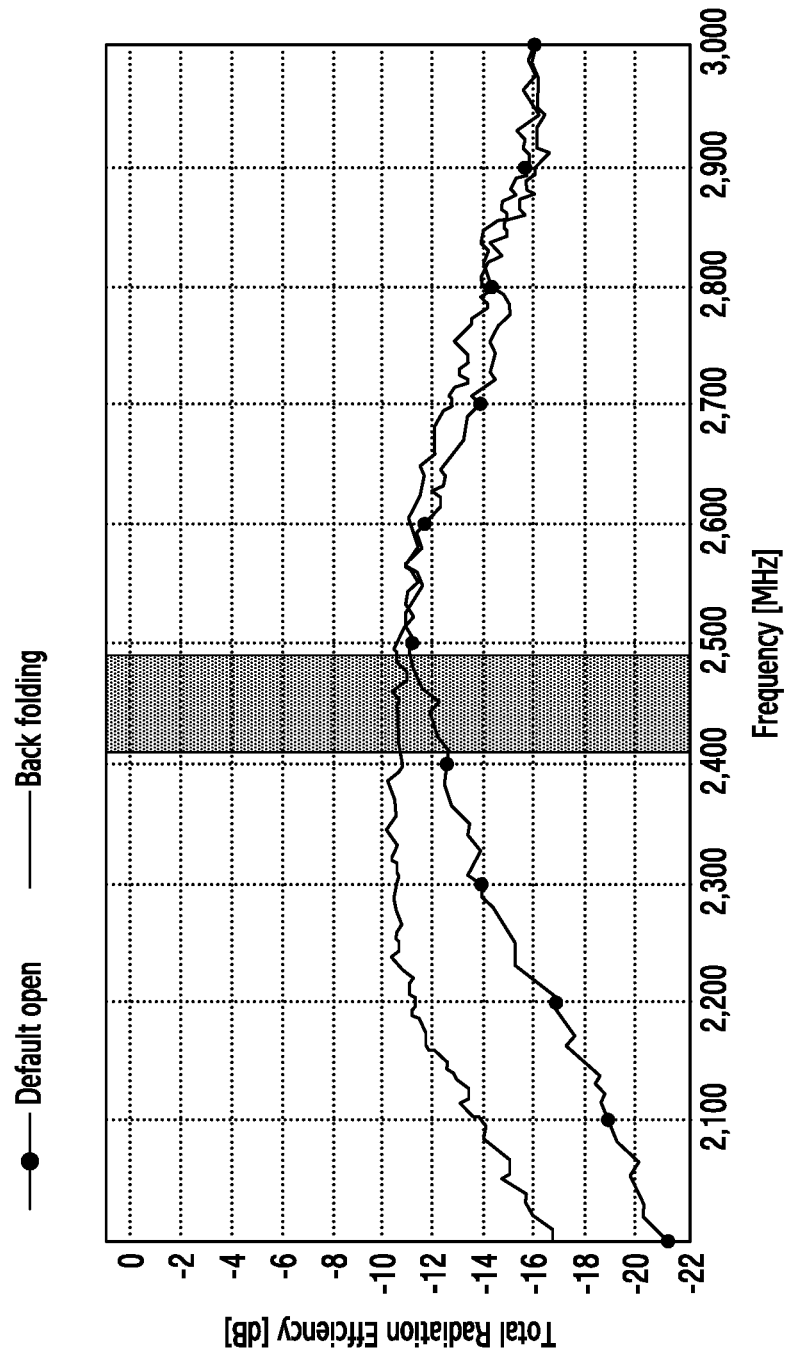
FIGS. 16A to 16C are graphs depicting antenna radiation efficiency under various folding conditions of an electronic device, according to an embodiment of the present disclosure.
Figure 16B:
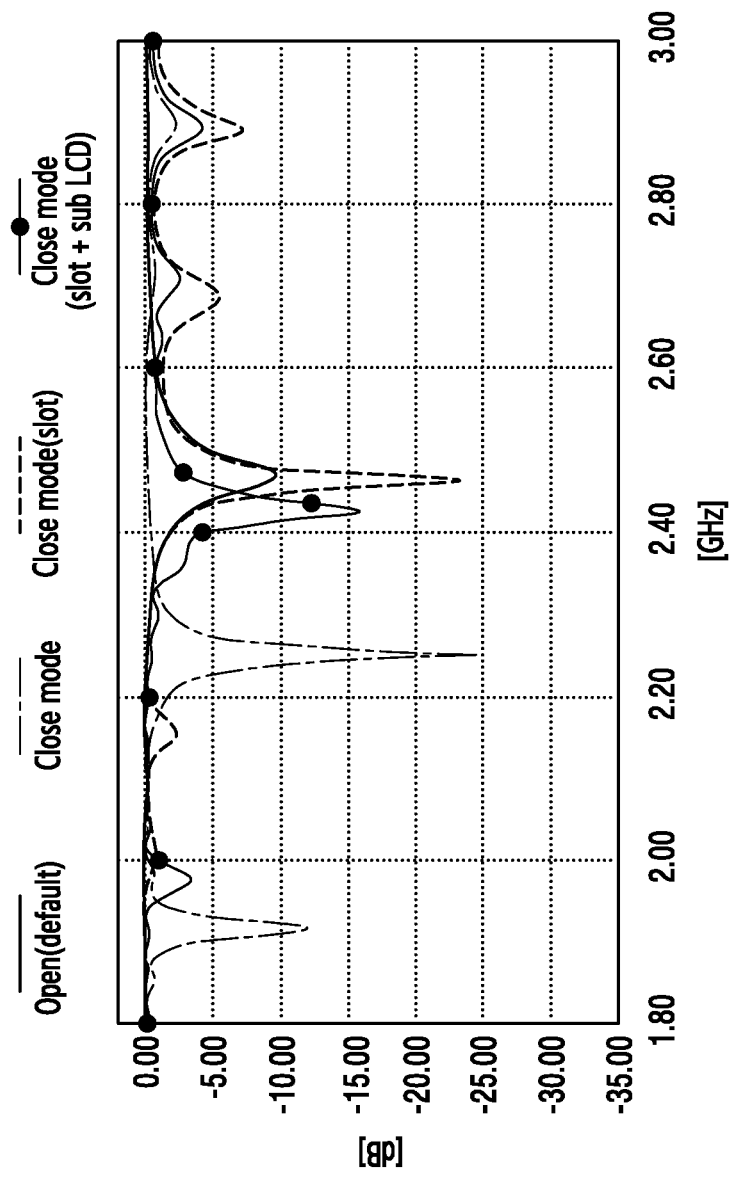
Figure 16C:
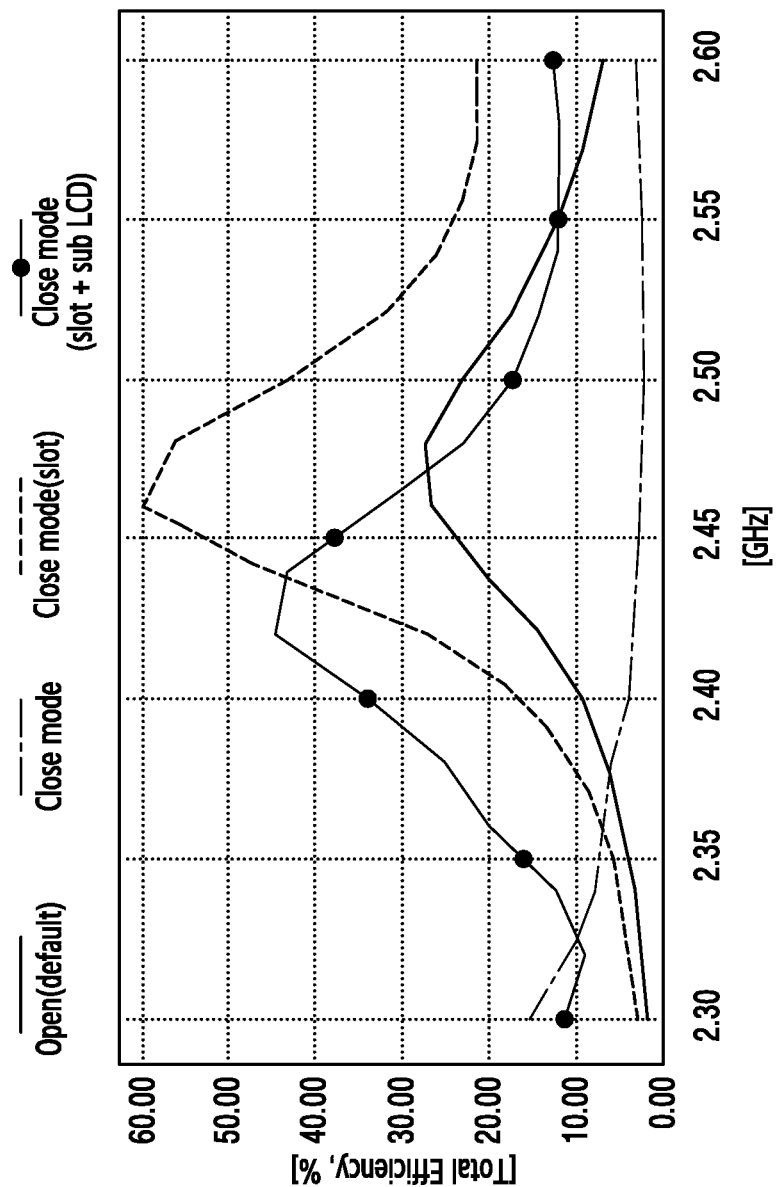
Figure 16D:
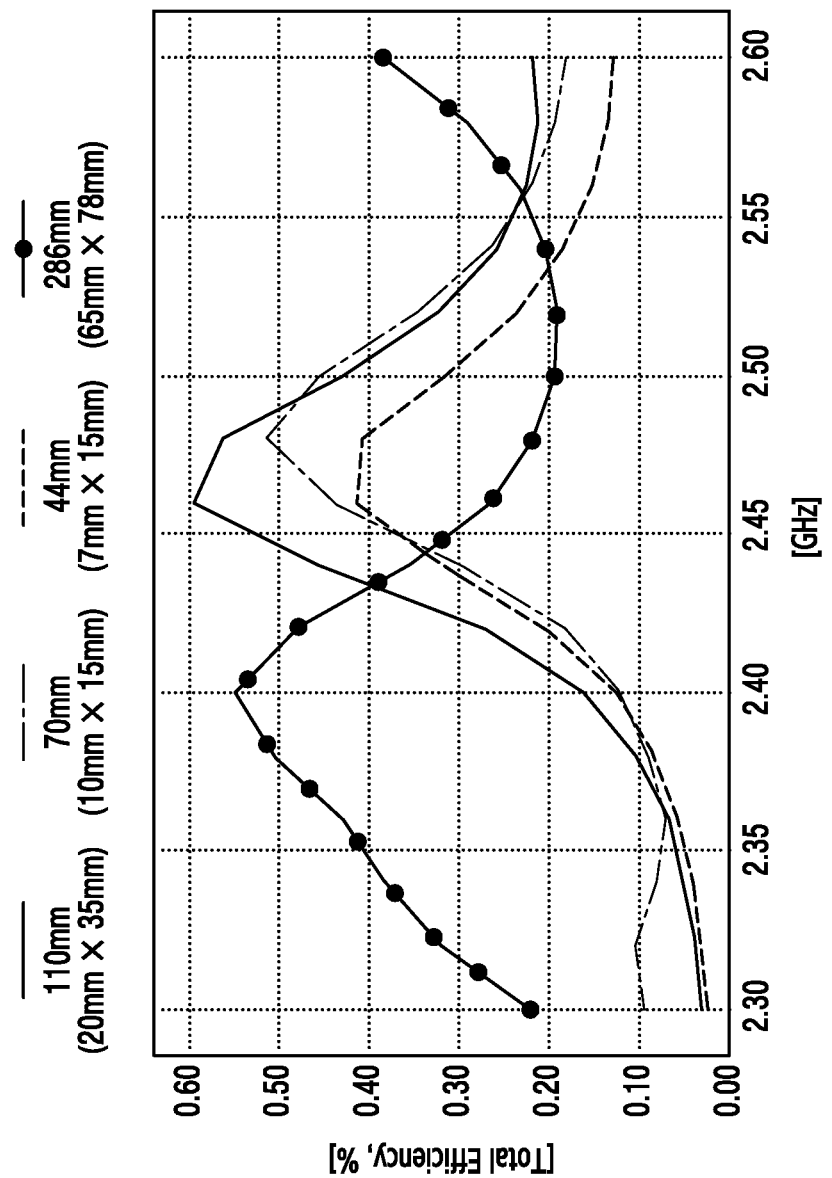
FIG. 16D is a graph depicting antenna radiation efficiency depending on the size of an opening of an electronic device, according to an embodiment of the present disclosure.

FIGS. 16A to 16C are graphs depicting antenna radiation efficiency under various folding conditions of an electronic device, according to an embodiment of the present disclosure. FIG. 16D is a graph depicting antenna radiation efficiency depending on the size of an opening, according to an embodiment of the present disclosure. The graphs will be described with reference to FIGS. 15A and 15B.

Referring to FIG. 16A, when the second body 1530 having the opening 1541 has been folded to the first body 1510 (back folding), the first conductive element 1513, which is disposed in the first body 1510 and operates in a 2.4 GHz band, has radiation efficiency that is about 1 dB greater than when the second body 1530 has been unfolded away from the first body 1510 (default open).

FIGS. 16B and 16C show standing wave ratios and efficiency in a state in which the second body 1530 has been unfolded away from the first body 1510 (open mode), in a state in which the second body 1530 that does not include the opening 1541 has been folded to the first body 1510 (close mode), in a state in which the second body 1530 that includes the opening 1541 has been folded to the first body 1510 (close mode (slot)), and in a state in which the second body 1530 that includes the opening 1541 and has the display 1550 mounted thereon has been folded to the first body 1510 (close mode (slot+sub LCD)).

Referring to FIG. 16B, the first conductive element 1513 operates in a desired operating frequency band (e.g., a 2.4 GHz band) in the state in which the second body 1530 has been unfolded away from the first body 1510. A problem arises in which the operating frequency band of the first conductive element 1513 shifts to an unused frequency band (e.g., a 2.2 GHz band) while the second body 1530 that does not include the opening 1541 has been folded to the first body 1510. In this case, the first conductive element 1513 may not operate in the WiFi band. The first conductive element 1513 operates in a desired operating frequency band while the second body 1530 that includes the opening 1541 has been folded to the first body 1510. In addition, the first conductive element 1513 operates in its operating frequency band as a result of the opening 1541 being formed in the second body 1530 even though the display module 1550 (e.g., a sub-LCD) is installed.

Referring to FIG. 16C, the first conductive element effectively operates in the corresponding frequency band (a 2.4 GHz band), as in FIG. 16B, while there is a slight difference in efficiency.

FIG. 16D is a graph depicting a variation in the efficiency of the first conductive element 1513 according to the size of the opening 1541. Referring to FIG. 16D, the first conductive element 1513 exhibits the highest efficiency when the first conductive element 1513 operates in a 2.4 GHz band and the opening 1541 is 20 mm by 35 mm, and the radiation efficiency decreases with decreasing size of the opening 1541. In addition, the radiation efficiency can deteriorate and the operation frequency band shifts when the opening 1541 has a size greater than a reference size (e.g., when the opening is 65 mm by 78 mm in FIG. 16D). Accordingly, the opening 1541 may be sized such that the maximum radiation efficiency may be exhibited according to the operating frequency band of the first conductive element 1513.

The radiation efficiency of the first conductive element 1513 may be determined based on a size and/or shape of the opening 1541, the permittivity of a dielectric material disposed between the first conductive element 1513 and the opening 1541 when the second body 1530 is folded to the first body 1510, the property of a dielectric material that fills the opening 1541, a nearby metal member, or the like.

Figure 17:
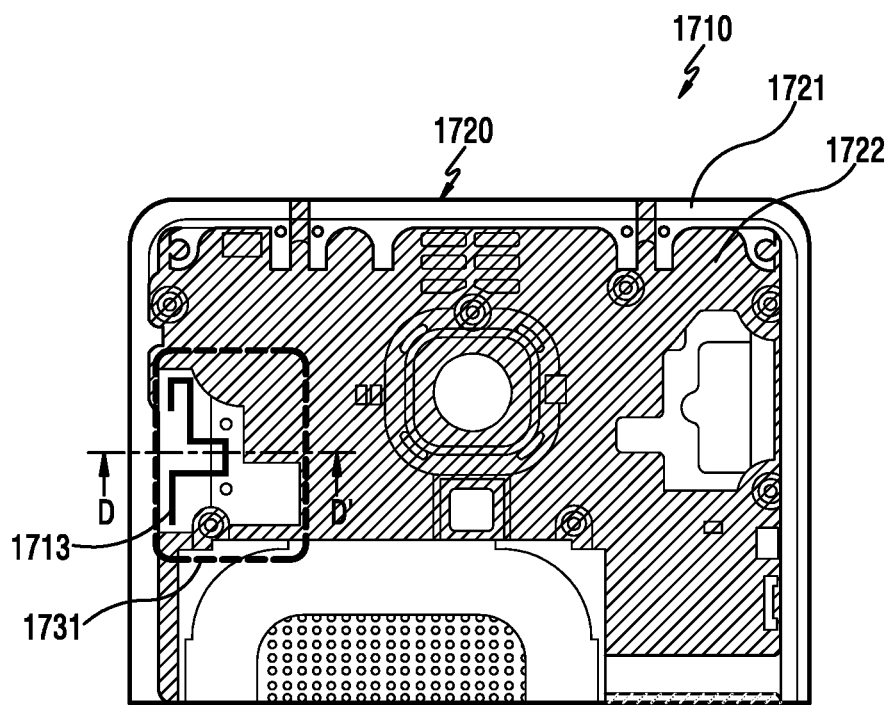
FIG. 17 is a diagram illustrating an arrangement relation between a first conductive element and a second conductive element, according to an embodiment of the present disclosure.

FIG. 17 is a diagram illustrating an arrangement relation between a first conductive element 1713 and a second conductive element 1731, according to an embodiment of the present disclosure.

A first body 1710 of FIG. 17 may be similar to the first body 1310 of FIG. 13, the first body B1 of FIG. 14, or the first body 1510 of FIG. 15A.

Referring to FIG. 17, the first body 1710 may include a first housing 1720, and the first housing 1720 may have a metal member 1721 and an injection-molded member 1722 that are formed by double injection molding. The first conductive element 1713 may be disposed on the first housing 1720, and the first conductive element 1713 may be electrically connected to a wireless communication circuit included in the first body 1710 to operate as an antenna radiator.

The second conductive element 1731 may be disposed on the first body 1710 to overlap the first conductive element 1713, and the second conductive element 1731 may be disposed on various members coupled with the first body 1710. The members may include a rear cover or an intermediate bracket that is coupled with the first housing 1710. When disposed to overlap the first conductive element 1713, the second conductive element 1731 may be disposed in a position where electrical coupling is possible. The second conductive element 1731 may be disposed on the inner surface of the rear cover coupled with the first housing 1720. The second conductive element 1731 may include a metal plate or a flexible printed circuit (FPC) having a pattern that is disposed on the rear cover, or a conductive paint applied to the surface of the rear cover.

The second conductive element 1731 may be formed in a closed loop shape and may be disposed such that at least a part of the first conductive element 1713 is included in the space of the closed loop. However, the second conductive element 1731 may also be disposed on the surface where the first conductive element 1713 is formed in order to surround the first conductive element.

Figure 18A:
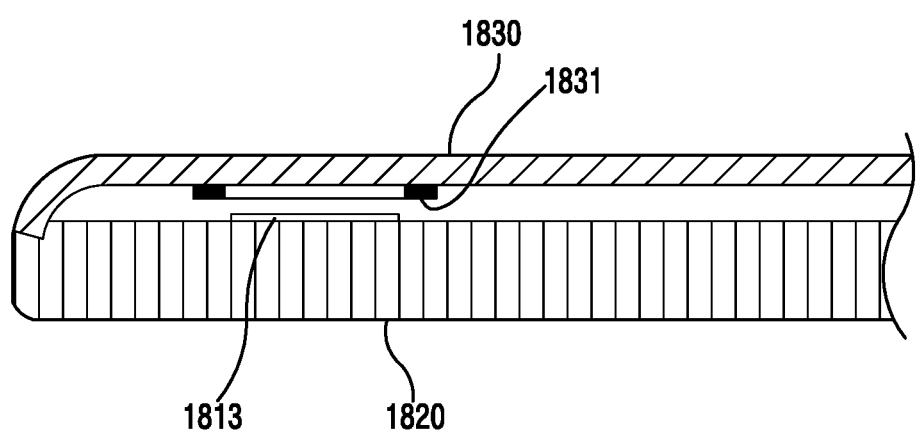
FIGS. 18A to 18C are diagrams illustrating arrangement states of second conductive elements, according to an embodiment of the present disclosure.
Figure 18B:
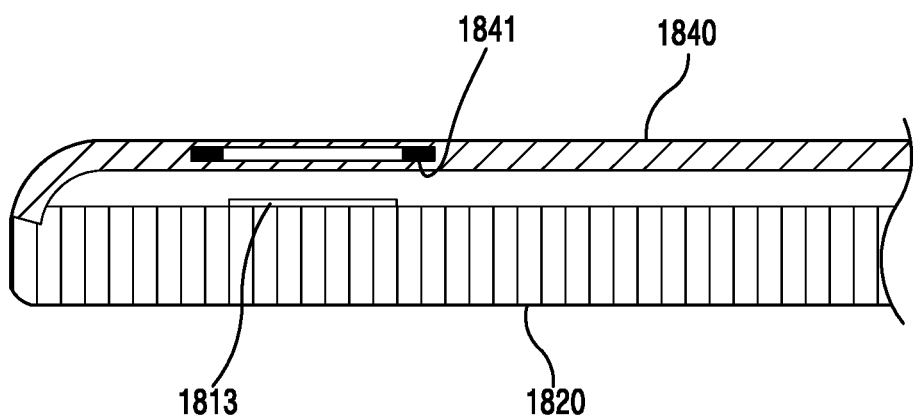
Figure 18C:
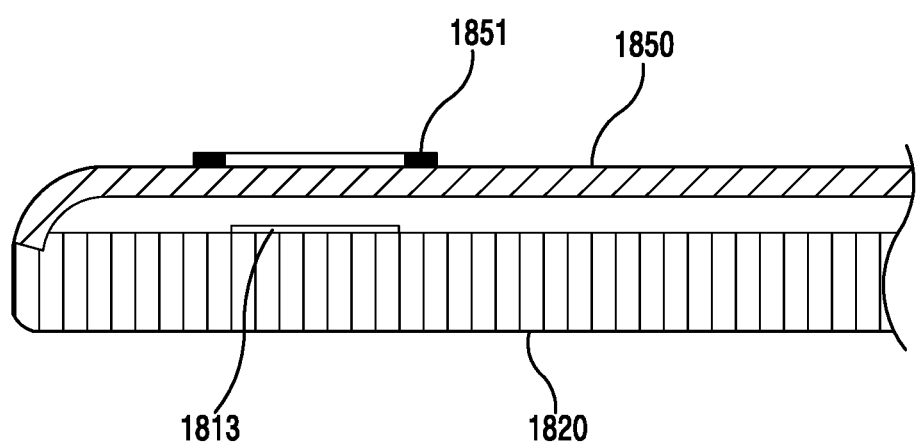

FIGS. 18A to 18C are diagrams illustrating arrangement states of second conductive elements, according to an of the present disclosure. FIGS. 18A to 18C are also sectional views taken along line D-D' of FIG. 17, where FIGS. 18A to 18C illustrate major components of the first body.

The second conductive elements 1831, 1841, and 1851 of FIGS. 18A to 18C may be similar to the second conductive element 1731 of FIG. 17.

Referring to FIG. 18A, a rear cover 1830 may be disposed on a first housing 1820, and the rear cover 1830 may be integrally formed with the first housing 1820, or may be detachably provided on the first housing 1820. The second conductive element 1831 may be disposed on the inner surface of the rear cover 1830, and the second conductive element 1831 may include a metal plate, a flexible printed circuit, or a conductive paint that is attached to the inner surface of the rear cover 1830. The second conductive element 1831 may be disposed in a position where the second conductive element 1831 is electrically coupled with the first conductive element 1813 so that the second conductive element 1831 may be used as a parasitic antenna element when the rear cover is mounted on the first housing 1820.

Referring to FIG. 18B, a rear cover 1840 may be disposed on the first housing 1820, and the rear cover 1840 may be integrally formed with the first housing 1820, or may be detachably provided on the first housing 1820. The second conductive element 1841 may be contained in the rear cover 1840, and the second conductive element 1841 may be inserted into the rear cover by an insert molding process when the rear cover 1840 that is an injection-molded member is formed. The second conductive element 1841 may include a metal plate. The second conductive element 1841 may be disposed in a position where the second conductive element 1841 is electrically coupled with the first conductive element 1813 so that the second conductive element 1841 may be used as a parasitic antenna element when the rear cover 1840 is mounted on the first housing 1820.

Referring to FIG. 18C, a rear cover 1850 may be disposed on the first housing 1820, and the rear cover 1850 may be integrally formed with the first housing 1820, or may be detachably provided on the first housing 1820. The second conductive element 1851 may be disposed on the outer surface of the rear cover 1850, and the second conductive element 1851 may also be used for a metal ornamental member that is attached to the exterior of the rear cover 1850. The second conductive element 1851 may be disposed in a position where the second conductive element 1851 is electrically coupled with the first conductive element 1813 so that the second conductive element 1851 may be used as a parasitic antenna element when the rear cover 1850 is mounted on the first housing 1820.

Figure 19:
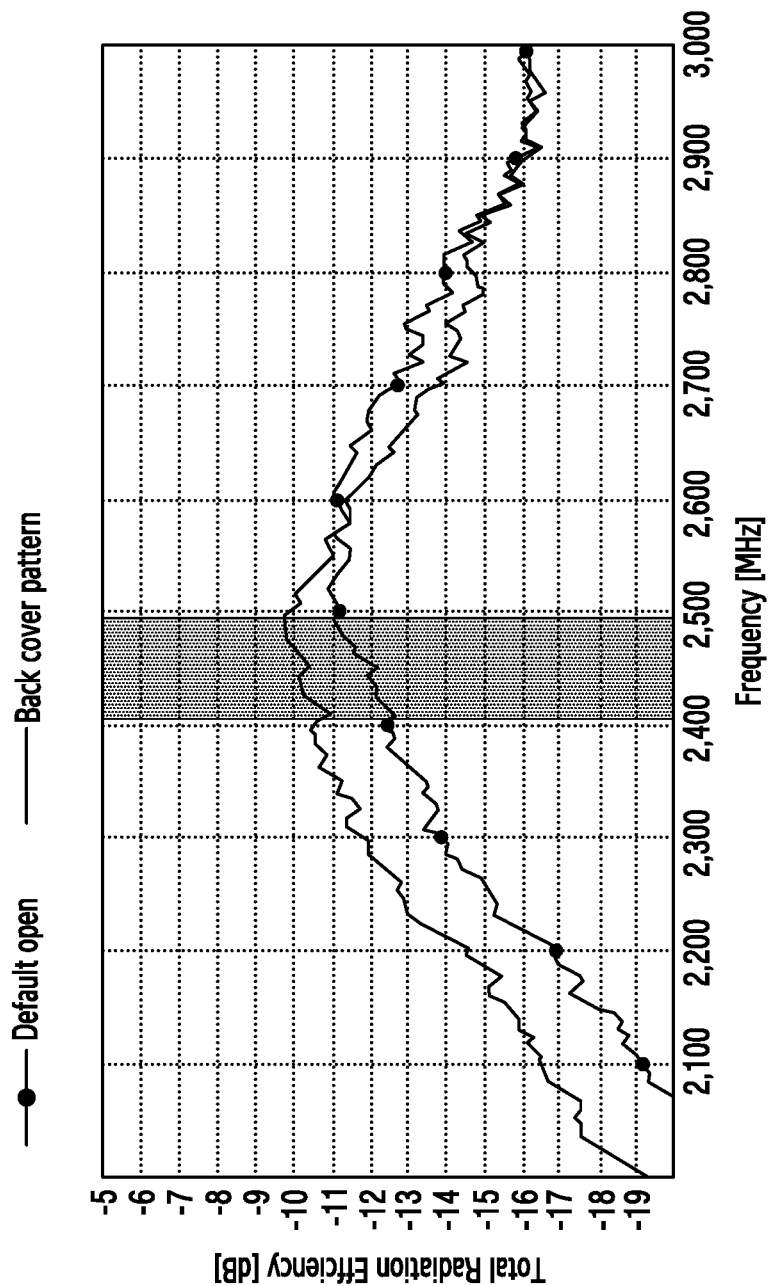
FIG. 19 is a graph depicting antenna radiation efficiency by means of a second conductive element when an electronic device is folded, according to an embodiment of the present disclosure.

FIG. 19 is a graph depicting antenna radiation efficiency by means of a second conductive element when an electronic device is folded, according to an embodiment of the present disclosure.

Referring to FIGS. 17 and 19, when the second body is separated from the first body 1710 (default open), the first conductive element 1513, which is disposed on the first body 1710 to which the rear cover having the second conductive element 1731 is applied, has radiation efficiency that is about 1.5 dB greater than that when a rear cover having no second conductive element is applied to the first body 1710.

Figure 20:
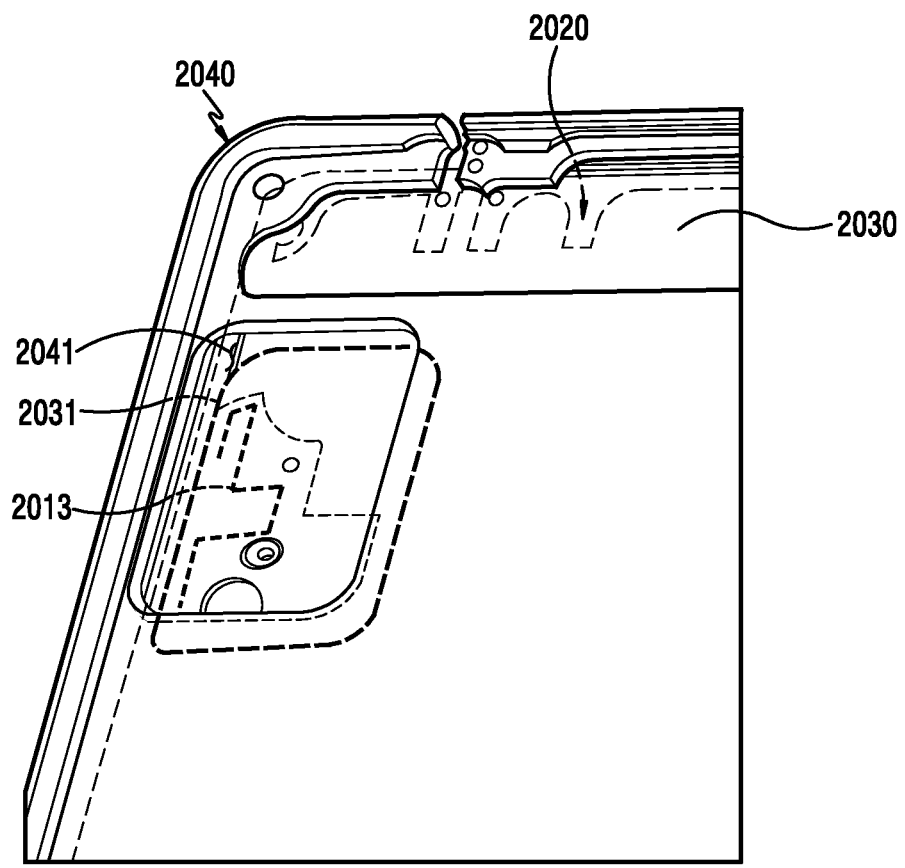
FIG. 20 is a diagram illustrating an arrangement relation between a first conductive element, an opening, and a second conductive element of an electronic device, according to an embodiment of the present disclosure.

FIG. 20 is a diagram illustrating an arrangement relation between a first conductive element 2013, an opening 2041, and a second conductive element 2031 of an electronic device, according to an embodiment of the present disclosure.

Referring to FIG. 20, the first conductive element 2013 may be disposed on a first housing 2020, a rear cover 2030 may be disposed on the first housing 2020, and the second conductive element 2031 may be disposed on the rear cover 2030. The second conductive element 2031 may be provided so as to be aligned with the first conductive element 2013 when the first housing 2020 and the second housing 2040 overlap each other. The second conductive element 2031 may have a closed loop shape, and at least a part of the first conductive element 2013 may be included in a closed loop area of the second conductive element 2031 when the first housing 2020 and the second housing 2040 overlap each other.

The second housing 2040 may be formed of a metal member, and the opening 2041 may be formed in the area of the second housing 2040 that corresponds to the first conductive element 2013 when the first housing 2020 and the second housing 2040 overlap each other. The opening 2041 may have a size that is the same as, or different from, that of the second conductive element 2031 disposed on the rear cover 2030. The size of the opening 2041 may be determined based on the operating frequency band of the first conductive element 2013 that is used as an antenna radiator. The second conductive element 2031 and the opening 2041 do not make physical contact with the first conductive element 2013 for an application to a parasitic antenna device of the first conductive element 2013, but may be electrically coupled with the first conductive element 2013.

The second housing 2040 may include a metal bracket that overlaps the first housing 2020. In a case where the second housing 2040 is used as a bracket, the second housing 2040 may be configured to be folded with respect to the first housing 2020, or may be disposed, as a part of the first housing 2020, above the first housing 2020.

Figure 21:
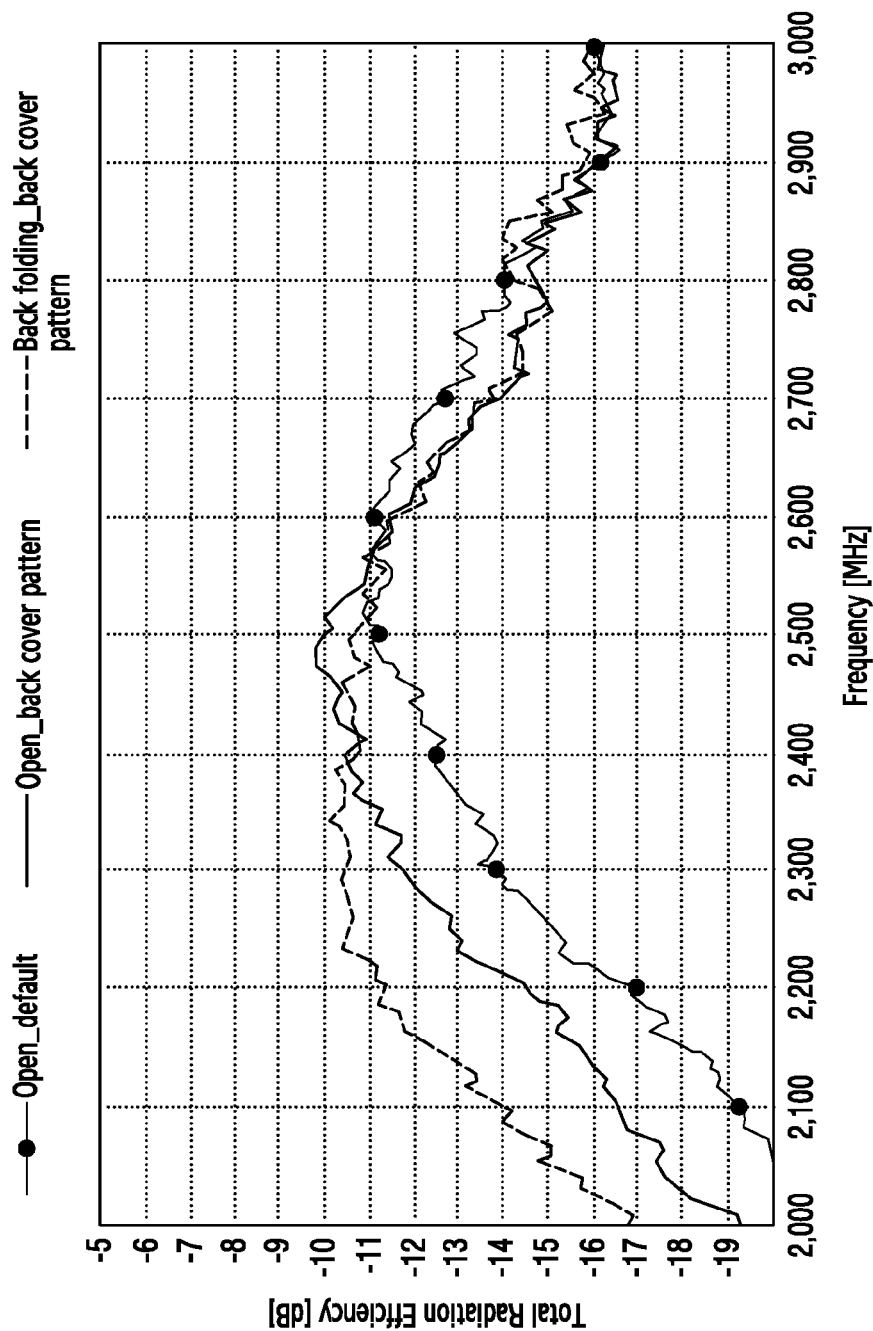
FIG. 21 is a graph depicting antenna radiation efficiency in the state of FIG. 20, according to an embodiment of the present disclosure.

FIG. 21 is a graph depicting antenna radiation efficiency in the state of FIG. 20, according to an embodiment of the present disclosure.

Referring to FIGS. 20 and 21, when the first housing 2020 and the second housing 2040 do no overlap each other and when the second conductive element 2031 is applied to the rear cover 2030, better radiation efficiency is exhibited at the same operating frequency band (e.g., a 2.4 GHz band) than when the second conductive element 2031 is not applied to the rear cover 2030. In addition, the radiation efficiency rarely changes in a desired operating frequency band (e.g., a 2.4 GHz band) even though the first housing 2020 and the second housing 2040 overlap each other after the second conductive element 2031 is applied to the rear cover 2030.

Figure 22:
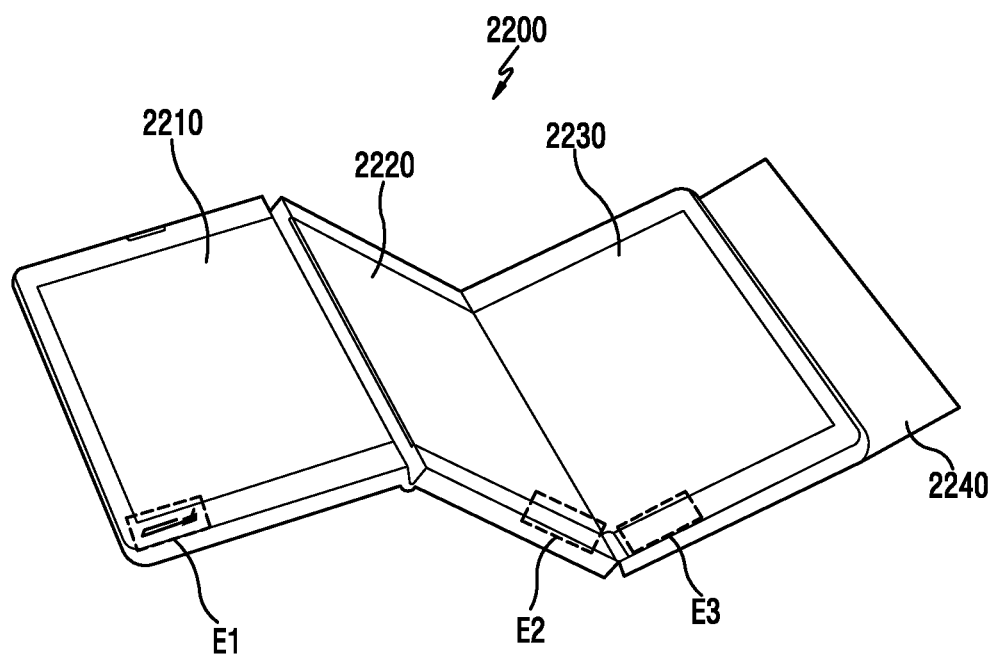
FIG. 22 is a perspective view of an electronic device in which three bodies (or portions) thereof are folded with respect to each other, according to an embodiment of the present disclosure.
Figure 23A:
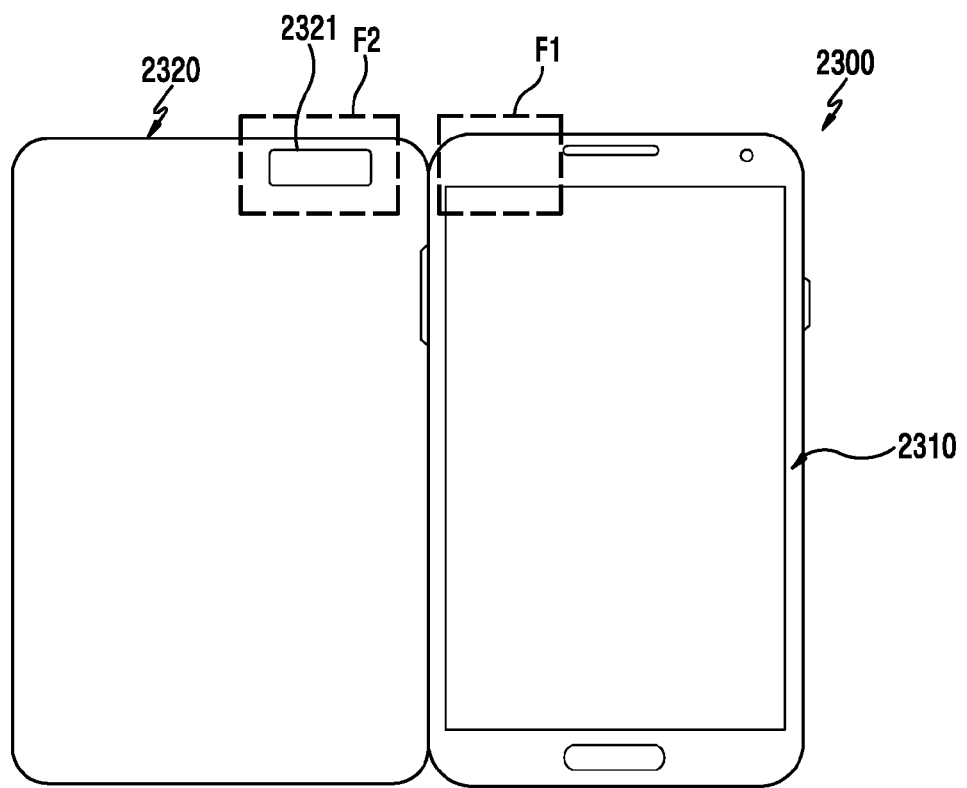
FIGS. 23A and 23B are diagrams illustrating an electronic device that includes a protective cover, according to an embodiment of the present disclosure.
Figure 23B:
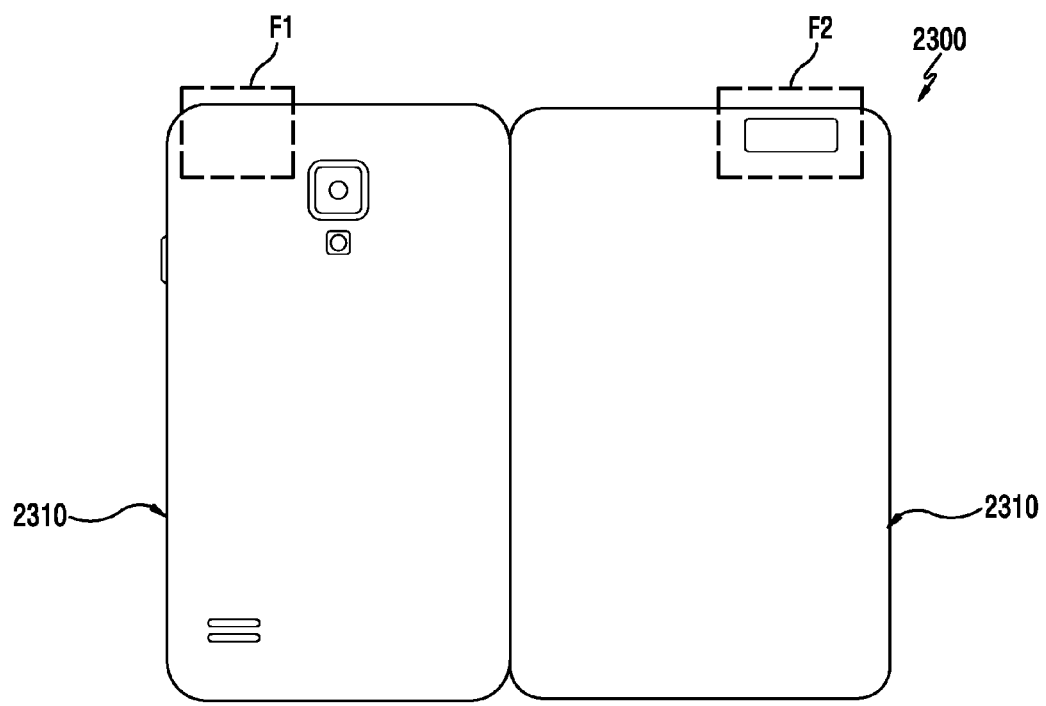
Figure 24:
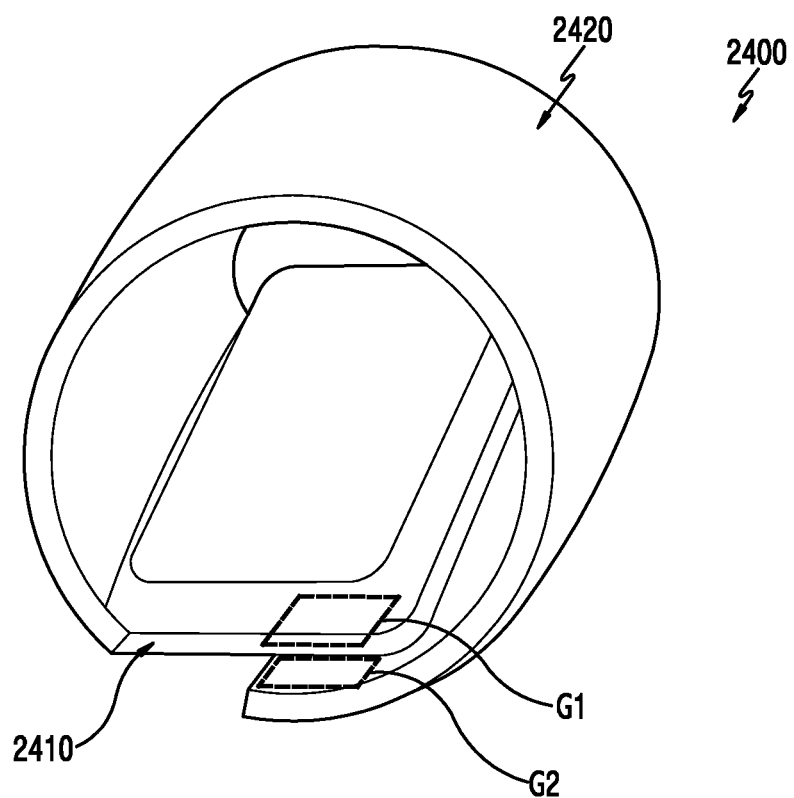
FIGS. 24, 25A, and 25B are diagrams illustrating wearable electronic devices, according to an embodiment of the present disclosure.
Figure 25A:
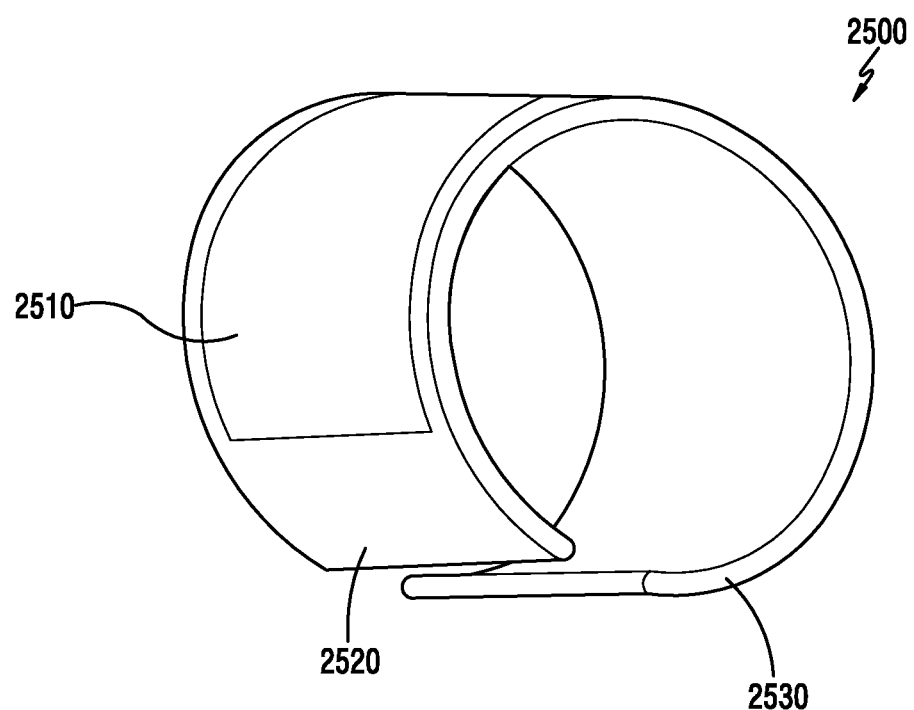
Figure 25B:
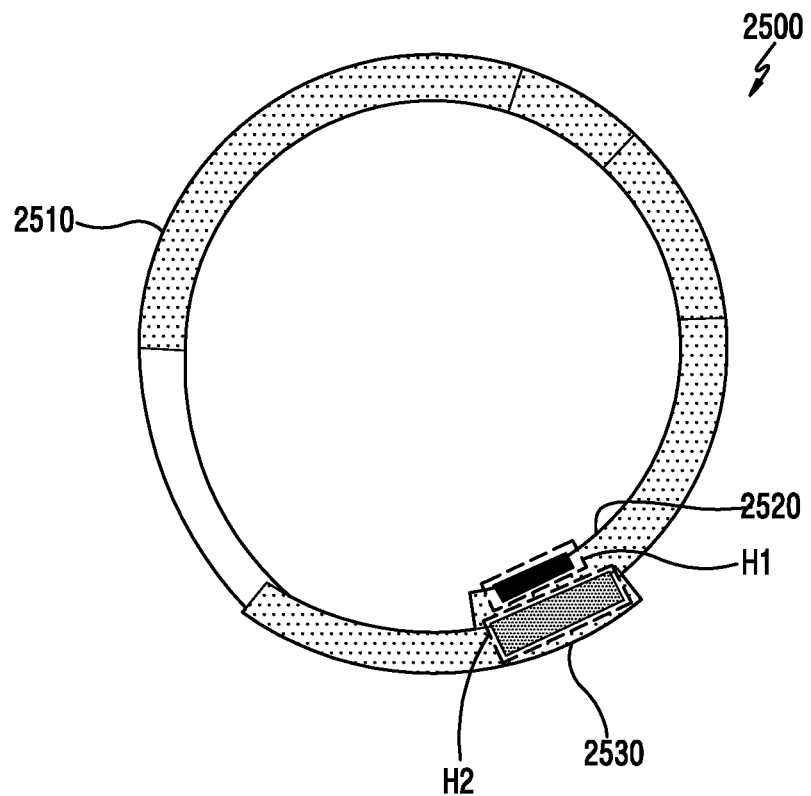

FIG. 22 is a perspective view of an electronic device, according to an embodiment of the present disclosure, in which three bodies are folded with respect to each other. FIGS. 23A and 23B are diagrams illustrating an electronic device that includes a protective cover, according to an embodiment of the present disclosure. FIGS. 24, 25A, and 25B are diagrams illustrating wearable electronic devices, according to an embodiment of the present disclosure.

Referring to FIG. 22, the electronic device 2200 includes three foldable bodies 2210, 2220, and 2230. The electronic device 2200 includes the first body 2210, the second body 2220 that is able to rotate relative to the first body 2210, and the third body 2230 that is able to rotate relative to the second body 2220. The first to third bodies 2210, 2220, and 2230 may be connected with each other through a connecting member 2240.

A conductive element and openings for preventing a degradation in the radiation efficiency of the conductive element may be provided in corresponding positions of the first to third bodies 2210, 2220, and 2230 in a case where the first to third bodies 2210, 2220, and 2230 are folded with respect to each other. In a case where a conductive element operating as an antenna radiator is provided in an area E1 of the first body 2210, and openings may be provided in corresponding areas E2 and E3 of the second and third bodies 2220 and 2230. Accordingly, even through the second body 2220 and/or the third body 2230 is/are folded to the first body 2210, the openings may prevent a degradation in the radiation efficiency of the conductive element used as an antenna radiator.

Referring to FIGS. 23A and 23B, the electronic device 2300 includes a main body 2310 and a protective cover 2320 for selectively protecting the main body 2310. A conductive element operating as an antenna radiator may be disposed in an area F1 on one side, or an opposite side, of the upper portion of the electronic device. In a case where the protective cover 2320 is folded to the main body 2310 to protect the main body 2310, the protective cover 2320 may include an opening 2321 in an area F2 that corresponds to the conductive element. The opening 2321 may be formed in the corresponding position of the protective cover 2320 formed of a metal member. The opening 2321 may be filled with, or hidden by, a non-metal material or the same material as the outer cover material of the protective cover 2320. Accordingly, even though the main body 2310 is hidden by the protective cover 2320, the opening provided in the area F2 may prevent a degradation in the radiation efficiency of the conductive element that is disposed in the area F1 and used as an antenna radiator.

Referring to FIG. 24, the electronic device 2400 includes a wearable electronic device that includes a main body 2410 and a connecting member 2420 connected with the main body 2410. The main body 2410 may include a conductive element operating as an antenna radiator, and the conductive element may be disposed in an area G1 of the main body 2410. In a case where the connecting member 2420 is fastened to the main body 2410, the connecting member 2420 may include an opening in an area G2. Even though the corresponding parts of the main body 2410 and the connecting member 2420 overlap each other, the opening formed in the area G2 may prevent a degradation in the radiation efficiency of the conductive element that is disposed in the area GI and used as an antenna radiator.

Referring to FIGS. 25A and 25B, the electronic device 2500 includes a wearable electronic device that can be worn on a human body. The electronic device 2500 may include a display. The electronic device 2500 also includes a first end portion 2520 and a second end portion 2530 opposite to the first end portion 2520, and when the electronic device 2500 is worn on a human body (e.g., wrist), the first and second end portions 2520 and 2530 may overlap each other. A conductive element used as an antenna radiator may be disposed in an area H1 of the first end portion 2520 that overlaps the second end portion 2530. An opening may be formed in an area H2 of the second end portion 2530 that overlaps the first end portion 2520. Accordingly, even though the first and second end portions 2520 and 2530 overlap each other, the opening formed in the area H2 may prevent a degradation in the radiation efficiency of the conductive element that is disposed in the area H1 and used as an antenna radiator.

When a conductive element is provided in a second housing to correspond to an antenna device provided in a first housing, a slot may be formed in an area corresponding to the antenna device in order to prevent a degradation in antenna radiation efficiency and to exhibit an excellent radiation characteristic.

An electronic device may include: a first housing having a first surface directed in a first direction and a second surface directed in a second direction opposite to the first direction; a second housing having a third surface directed in a third direction and a fourth surface directed in a fourth direction opposite to the third direction; a first display disposed on the first housing and exposed through the first surface; a second display disposed on the second housing and exposed through the third surface; a connecting member configured to couple the first housing to the second housing, wherein the first housing and the second housing are foldable to each other, and the second surface and the fourth surface face each other when the first housing and the second housing are folded to each other; a first conductive element disposed inside the first housing so as to be located between the second surface and the first display; a wireless communication circuit electrically connected to the first conductive element; and an intermediate conductive plate disposed inside the second housing so as to be located between the fourth surface and the second display, wherein the intermediate conductive plate may have an opening configured to face the first conductive element when the first housing and the second housing are folded to each other.

The electronic device may further include a second conductive element formed in an annular shape on the first housing or the second housing, and the second conductive element may be disposed to surround the first conductive element when viewed from above the second or fourth surface in a case where the first housing and the second housing are folded to each other.

The electronic device may further include a third conductive element formed in an annular shape on the first housing or the second housing, and the third conductive element may be disposed to surround the first conductive element when viewed from above the second or fourth surface in a case where the first housing and the second housing are folded to each other.

The opening may be disposed in a position where the opening is coupled with the first conductive element without making contact with the first conductive element when the first housing and the second housing are folded to each other.

The opening may be disposed such that at least a part of the first conductive element overlaps the interior of the first conductive element having an annular shape when viewed from above the second or fourth surface in a case where the first housing and the second housing are folded to each other.

The radiation efficiency of the first conductive element may be determined based on the size or shape of the opening or the permittivity of a dielectric material interposed between the first housing and the second housing when the first housing and the second housing are folded to each other.

A rear cover may be disposed on the second surface of the first housing, and a second conductive element may be disposed in a position in the rear cover to correspond to the first conductive element when viewed from above the second surface.

The second conductive element may be disposed in a position where the second conductive element is electrically coupled with the first conductive element without making contact with the first conductive element.

The second conductive element may be disposed on the inner or outer surface of the rear cover or inside the rear cover.

The second conductive element disposed on the inner or outer surface of the rear cover may include a metal plate, a flexible printed circuit, or a conductive paint.

The second conductive element disposed inside the rear cover may include a metal plate that is insert-molded into the rear cover made of a synthetic resin.

An electronic device may include: a first body that includes a first housing; a second body that is configured to rotate relative to the first body and includes a second housing made of metal; a first antenna radiator disposed in at least one area of the first housing; and an opening provided in a corresponding position of the second housing that overlaps the first antenna radiator when the first body and the second body are folded to each other such that the first body is superposed on the second body.

The opening may be disposed in a position where the opening is coupled with the first antenna radiator without making contact with the first antenna radiator when the first body and the second body are folded to each other.

At least a part of the first antenna radiator may be included in the opening when the first body and the second body are folded to each other.

The radiation efficiency of the first antenna radiator may be determined based on the size or shape of the opening or the permittivity of a dielectric material interposed between the first body and the second body when the first body and the second body are folded to each other.

A second antenna radiator may be disposed to overlap at least a part of the first antenna radiator in the first body.

The second antenna radiator may be electrically coupled with the first antenna radiator without making contact with the first antenna radiator.

An electronic device may include: a first body that includes a first housing; a second body that is configured to rotate relative to the first body and includes a second housing made of metal; a first antenna radiator disposed in at least one area of the first housing; a second antenna radiator disposed to overlap at least a part of the first antenna radiator in the first body; and an opening provided in a corresponding position of the second housing that overlaps the first antenna radiator when the first body and the second body are folded to each other such that the first body is superposed on the second body.

The second antenna radiator may be disposed on the inner or outer surface of a rear cover coupled to the first housing, or is disposed inside the rear cover.

The second antenna radiator may be disposed so as to be electrically coupled with the first antenna radiator without making contact with the first antenna radiator, and the opening may be provided so as to be electrically coupled with the first antenna radiator without making contact with the first antenna radiator when the first body and the second body are folded to each other.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

What is claimed is:

1. An electronic device comprising:
    a first housing having a first surface and a second surface opposite to the first surface;
    a second housing having a third surface and a fourth surface opposite to the third surface;
    a first display disposed on the first housing;
    a second display disposed on the second housing;
    a connecting member configured to couple the first housing to the second housing such that the first housing and the second housing are foldable relative to each other, and the second surface and the fourth surface face each other when the first housing and the second housing are folded toward each other;
    a first conductive element disposed within the first housing and between the second surface and the first display;
    a wireless communication circuit electrically connected to the first conductive element; and
    an intermediate conductive plate disposed within the second housing and between the fourth surface and the second display, the intermediate conductive plate having an opening that faces the first conductive element when the first housing and the second housing are in a folded configuration.

2. The electronic device of claim 1, further comprising:
a second conductive element formed on one of the first housing and the second housing, wherein the second conductive element surrounds the first conductive element when the first housing and the second housing are in a folded configuration.

3. The electronic device of claim 2, further comprising:
a third conductive element formed on one of the first housing and the second housing, wherein the third conductive element surrounds the first conductive element when the first housing and the second housing are in a folded configuration.

4. The electronic device of claim 1, wherein the opening of the intermediate conductive plate is electrically coupleable to the first conductive element when the first housing and the second housing are in a folded configuration.

5. The electronic device of claim 4, wherein the opening is disposed such that at least a part of the first conductive element overlaps an interior of the first conductive element when the first housing and the second housing are in a folded configuration.

6. The electronic device of claim 1, wherein a radiation efficiency of the first conductive element is determined based on one of a size or shape of the opening of the intermediate conductive plate and a permittivity of a dielectric material interposed between the first housing and the second housing when the first housing and the second housing are in a folded configuration.

7. The electronic device of claim 1, wherein a rear cover of the electronic device is disposed on the second surface of the first housing, and a second conductive element is disposed on the rear cover corresponding to a position of the first conductive element.

8. The electronic device of claim 7, wherein the second conductive element is electrically coupled to the first conductive element without making contact with the first conductive element.

9. The electronic device of claim 7, wherein the second conductive element is disposed on one of an inner or outer surface of the rear cover and inside the rear cover.

10. The electronic device of claim 9, wherein when the second conductive element is disposed on the inner or outer surface of the rear cover, the second conductive element comprises one of a metal plate, a flexible printed circuit, and a conductive paint.

11. The electronic device of claim 8, wherein when the second conductive element is disposed inside the rear cover, the second conductive element comprises a metal plate that is insert-molded into the rear cover, which is made of a synthetic resin.

12. An electronic device comprising:
a first body comprising a first housing;
a second body rotatable relative to the first body and comprising a second housing made of metal;
a first antenna radiator disposed on the first housing; and
an opening provided on the second housing such that the opening overlaps the first antenna radiator when the first body and the second body are in a folded configuration.

13. The electronic device of claim 12, wherein the opening provided on the second housing is electrically coupleable to the first antenna radiator when the first body and the second body are in a folded configuration.

14. The electronic device of claim 12, wherein at least a part of the first antenna radiator is disposed within the opening when the first body and the second body are in a folded configuration.

15. The electronic device of claim 12, wherein a radiation efficiency of the first antenna radiator is determined based on one of a size or shape of the opening and a permittivity of a dielectric material interposed between the first body and the second body when the first body and the second body are in a folded configuration.

16. The electronic device of claim 12, wherein a second antenna radiator is disposed to overlap at least a part of the first antenna radiator in the first body.

17. The electronic device of claim 16, wherein the second antenna radiator is electrically coupled to the first antenna radiator without making contact with the first antenna radiator.

18. An electronic device comprising:
a first body comprising a first housing;
a second body rotatable relative to the first body and comprising a second housing made of metal;
a first antenna radiator disposed on the first housing;
a second antenna radiator overlapping at least a part of the first antenna radiator in the first body; and
an opening provided on the second housing such that the opening overlaps the first antenna radiator when the first body and the second body are in a folded configuration.

19. The electronic device of claim 18, wherein the second antenna radiator is disposed on one of an inner or outer surface of a rear cover coupled to the first housing and on an inside of the rear cover.

20. The electronic device of claim 18, wherein the second antenna radiator is electrically coupled to the first antenna radiator without making contact with the first antenna radiator, and the opening is electrically coupleable to the first antenna radiator when the first body and the second body are in a folded configuration.

* * * * *